(12) United States Patent
Gupta et al.

(10) Patent No.: US 10,033,766 B2
(45) Date of Patent: Jul. 24, 2018

(54) POLICY-DRIVEN COMPLIANCE

(71) Applicant: Cisco Technology, Inc., San Jose, CA (US)

(72) Inventors: Sunil Kumar Gupta, Milpitas, CA (US); Navindra Yadav, Cupertino, CA (US); Michael Standish Watts, Mill Valley, CA (US); Ali Parandehgheibi, Sunnyvale, CA (US); Shashidhar Gandham, Fremont, CA (US); Ashutosh Kulshreshtha, Fremont, CA (US); Khawar Deen, Sunnyvale, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 178 days.

(21) Appl. No.: 15/133,155

(22) Filed: Apr. 19, 2016

(65) Prior Publication Data

US 2016/0359915 A1  Dec. 8, 2016

Related U.S. Application Data

(60) Provisional application No. 62/171,899, filed on Jun. 5, 2015.

(51) Int. Cl.
   *H04L 29/06* (2006.01)
   *H04L 12/26* (2006.01)

(52) U.S. Cl.
   CPC .............. *H04L 63/20* (2013.01); *H04L 43/04* (2013.01)

(58) Field of Classification Search
   CPC .................................. H04L 63/20; H04L 43/04
   See application file for complete search history.

(56) References Cited

U.S. PATENT DOCUMENTS 5,742,829 A   4/1998   Davis et al.
5,903,545 A   5/1999   Sabourin et al.
(Continued)

FOREIGN PATENT DOCUMENTS

CN   101093452   12/2007
CN   101770551   7/2010
(Continued)

OTHER PUBLICATIONS

Bosch, Greg, "Virtualization," 2010, 33 pages.
(Continued)

*Primary Examiner* — Darren B Schwartz
(74) *Attorney, Agent, or Firm* — Polsinelli PC

(57) ABSTRACT

A network can achieve compliance by defining and enforcing a set of network policies to secure protected electronic information. The network can monitor network data, host/endpoint data, process data, and user data for traffic using a sensor network that provides multiple perspectives. The sensor network can include sensors for networking devices, physical servers, hypervisors or shared kernels, virtual partitions, and other network components. The network can analyze the network data, host/endpoint data, process data, and user data to determine policies for traffic. The network can determine expected network actions based on the policies, such as allowing traffic, denying traffic, configuring traffic for quality of service (QoS), or redirecting traffic along a specific route. The network can update policy data based on the expected network actions and actual network actions. The policy data can be utilized for compliance.

19 Claims, 6 Drawing Sheets

(56) References Cited

U.S. PATENT DOCUMENTS

| | | |
|---|---|---|
| 6,012,096 A | 1/2000 | Link et al. |
| 6,144,962 A | 11/2000 | Weinberg et al. |
| 6,247,058 B1 | 6/2001 | Miller et al. |
| 6,330,562 B1 | 12/2001 | Boden et al. |
| 6,525,658 B2 | 2/2003 | Streetman et al. |
| 6,611,896 B1 | 8/2003 | Mason, Jr. et al. |
| 6,728,779 B1 | 4/2004 | Griffin et al. |
| 6,801,878 B1 | 10/2004 | Hintz et al. |
| 6,847,993 B1 | 1/2005 | Novaes et al. |
| 6,925,490 B1 | 8/2005 | Novaes et al. |
| 6,958,998 B2 | 10/2005 | Shorey |
| 6,983,323 B2 | 1/2006 | Cantrell et al. |
| 6,996,817 B2 | 2/2006 | Birum et al. |
| 7,002,464 B2 | 2/2006 | Bruemmer et al. |
| 7,120,934 B2 | 10/2006 | Ishikawa |
| 7,181,769 B1* | 2/2007 | Keanini .............. H04L 63/1416 713/166 |
| 7,185,103 B1 | 2/2007 | Jain |
| 7,337,206 B1 | 2/2008 | Wen et al. |
| 7,353,511 B1 | 4/2008 | Ziese |
| 7,370,092 B2 | 5/2008 | Aderton et al. |
| 7,395,195 B2 | 7/2008 | Suenbuel et al. |
| 7,444,404 B2 | 10/2008 | Wetherall et al. |
| 7,466,681 B2 | 12/2008 | Ashwood-Smith et al. |
| 7,467,205 B1 | 12/2008 | Dempster |
| 7,496,040 B2 | 2/2009 | Seo |
| 7,496,575 B2 | 2/2009 | Donato |
| 7,530,105 B2 | 5/2009 | Gilbert et al. |
| 7,610,330 B1 | 10/2009 | Quinn |
| 7,633,942 B2 | 12/2009 | Bearden et al. |
| 7,676,570 B2 | 3/2010 | Levy et al. |
| 7,681,131 B1 | 3/2010 | Quarterman et al. |
| 7,693,947 B2 | 4/2010 | Judge et al. |
| 7,752,307 B2 | 7/2010 | Takara |
| 7,783,457 B2 | 8/2010 | Cunningham |
| 7,844,696 B2 | 11/2010 | Labovitz et al. |
| 7,844,744 B2 | 11/2010 | Abercrombie et al. |
| 7,864,707 B2 | 1/2011 | Dimitropoulos et al. |
| 7,873,025 B2 | 1/2011 | Patel et al. |
| 7,874,001 B2 | 1/2011 | Beck et al. |
| 7,885,197 B2 | 2/2011 | Metzler |
| 7,895,649 B1 | 2/2011 | Brook et al. |
| 7,904,420 B2 | 3/2011 | Ianni |
| 7,930,752 B2 | 4/2011 | Hertzog et al. |
| 7,934,248 B1 | 4/2011 | Hanna |
| 7,957,934 B2 | 6/2011 | Greifeneder |
| 7,961,637 B2 | 6/2011 | McBeath |
| 7,970,946 B1 | 6/2011 | Djabarov et al. |
| 7,975,035 B2 | 7/2011 | Popescu et al. |
| 8,005,935 B2 | 8/2011 | Pradhan et al. |
| 8,040,232 B2 | 10/2011 | Oh et al. |
| 8,040,822 B2 | 10/2011 | Proulx et al. |
| 8,135,657 B2 | 3/2012 | Kapoor et al. |
| 8,156,430 B2 | 4/2012 | Newman |
| 8,185,824 B2 | 5/2012 | Mitchell et al. |
| 8,250,657 B1 | 8/2012 | Nachenberg et al. |
| 8,255,972 B2 | 8/2012 | Azagury |
| 8,266,697 B2 | 9/2012 | Coffman |
| 8,281,397 B2 | 10/2012 | Vaidyanathan et al. |
| 8,291,495 B1 | 10/2012 | Burns et al. |
| 8,296,847 B2 | 10/2012 | Mendonca et al. |
| 8,370,407 B1 | 2/2013 | Devarajan et al. |
| 8,381,289 B1 | 2/2013 | Pereira et al. |
| 8,391,270 B2 | 3/2013 | Van Der Stok et al. |
| 8,407,164 B2 | 3/2013 | Malik et al. |
| 8,442,073 B2 | 5/2013 | Skubacz et al. |
| 8,451,731 B1 | 5/2013 | Lee et al. |
| 8,462,212 B1 | 6/2013 | Kundu et al. |
| 8,489,765 B2 | 7/2013 | Vasseur et al. |
| 8,516,590 B1 | 8/2013 | Ranadive et al. |
| 8,527,977 B1 | 9/2013 | Cheng et al. |
| 8,570,861 B1 | 10/2013 | Brandwine et al. |
| 8,572,600 B2 | 10/2013 | Chung et al. |
| 8,572,734 B2 | 10/2013 | McConnell et al. |
| 8,572,735 B2 | 10/2013 | Ghosh et al. |
| 8,588,081 B2 | 11/2013 | Salam et al. |
| 8,600,726 B1 | 12/2013 | Varshney et al. |
| 8,630,316 B2 | 1/2014 | Haba |
| 8,640,086 B2 | 1/2014 | Bonev et al. |
| 8,661,544 B2 | 2/2014 | Yen et al. |
| 8,677,487 B2 | 3/2014 | Balupari et al. |
| 8,683,389 B1 | 3/2014 | Bar-Yam et al. |
| 8,706,914 B2 | 4/2014 | Duchesneau |
| 8,719,452 B1 | 5/2014 | Ding et al. |
| 8,719,835 B2 | 5/2014 | Kanso et al. |
| 8,752,042 B2 | 6/2014 | Ratica |
| 8,755,396 B2 | 6/2014 | Sindhu et al. |
| 8,762,951 B1 | 6/2014 | Kosche et al. |
| 8,769,084 B2 | 7/2014 | Westerfeld et al. |
| 8,776,180 B2 | 7/2014 | Kumar et al. |
| 8,812,725 B2 | 8/2014 | Kulkarni |
| 8,813,236 B1 | 8/2014 | Saha et al. |
| 8,825,848 B1 | 9/2014 | Dotan et al. |
| 8,832,013 B1 | 9/2014 | Adams et al. |
| 8,832,461 B2 | 9/2014 | Saroiu et al. |
| 8,849,926 B2 | 9/2014 | Marzencki et al. |
| 8,881,258 B2 | 11/2014 | Paul et al. |
| 8,887,238 B2 | 11/2014 | Howard et al. |
| 8,904,520 B1 | 12/2014 | Nachenberg et al. |
| 8,931,043 B2 | 1/2015 | Cooper et al. |
| 8,954,610 B2 | 2/2015 | Berke et al. |
| 8,973,147 B2 | 3/2015 | Pearcy et al. |
| 8,990,386 B2 | 3/2015 | He et al. |
| 8,996,695 B2 | 3/2015 | Anderson et al. |
| 8,997,227 B1 | 3/2015 | Mhatre et al. |
| 9,015,716 B2 | 4/2015 | Fletcher et al. |
| 9,071,575 B2 | 6/2015 | Lemaster et al. |
| 9,088,598 B1 | 7/2015 | Zhang et al. |
| 9,110,905 B2 | 8/2015 | Polley et al. |
| 9,160,764 B2 | 10/2015 | Stiansen et al. |
| 9,178,906 B1 | 11/2015 | Chen et al. |
| 9,197,654 B2 | 11/2015 | Ben-Shalom et al. |
| 9,225,793 B2 | 12/2015 | Dutta et al. |
| 9,237,111 B2 | 1/2016 | Banavalikar et al. |
| 9,246,773 B2 | 1/2016 | Degioanni |
| 9,258,217 B2 | 2/2016 | Duffield et al. |
| 9,281,940 B2 | 3/2016 | Matsuda et al. |
| 9,317,574 B1 | 4/2016 | Brisebois et al. |
| 9,319,384 B2 | 4/2016 | Yan et al. |
| 9,405,903 B1 | 8/2016 | Xie et al. |
| 9,418,222 B1 | 8/2016 | Rivera et al. |
| 9,454,324 B1 | 9/2016 | Madhavapeddi |
| 9,501,744 B1 | 11/2016 | Brisebois et al. |
| 9,634,915 B2 | 4/2017 | Bley |
| 9,645,892 B1 | 5/2017 | Patwardhan |
| 9,733,973 B2 | 8/2017 | Prasad et al. |
| 2002/0053033 A1* | 5/2002 | Cooper ............... H04L 41/0681 726/7 |
| 2002/0103793 A1 | 8/2002 | Koller et al. |
| 2002/0141343 A1 | 10/2002 | Bays |
| 2002/0184393 A1 | 12/2002 | Leddy et al. |
| 2003/0097439 A1 | 5/2003 | Strayer et al. |
| 2003/0145232 A1 | 7/2003 | Poletto et al. |
| 2003/0154399 A1* | 8/2003 | Zuk ..................... H04L 63/0254 726/11 |
| 2004/0030776 A1* | 2/2004 | Cantrell .................. H04L 29/06 709/224 |
| 2004/0268149 A1* | 12/2004 | Aaron ..................... H04L 63/02 726/11 |
| 2005/0039104 A1 | 2/2005 | Shah et al. |
| 2005/0166066 A1* | 7/2005 | Ahuja ................. H04L 63/0428 713/189 |
| 2005/0207376 A1 | 9/2005 | Ashwood-Smith et al. |
| 2005/0257244 A1 | 11/2005 | Joly et al. |
| 2005/0289244 A1* | 12/2005 | Sahu ................... H04L 67/2819 709/249 |
| 2006/0048218 A1* | 3/2006 | Lingafelt ............. H04L 63/0227 726/11 |
| 2006/0080733 A1 | 4/2006 | Khosmood et al. |
| 2006/0095968 A1 | 5/2006 | Portolani et al. |
| 2006/0156408 A1 | 7/2006 | Himberger |
| 2006/0195448 A1 | 8/2006 | Newport |
| 2006/0272018 A1 | 11/2006 | Fouant |
| 2006/0274659 A1 | 12/2006 | Ouderkirk |

(56) References Cited

U.S. PATENT DOCUMENTS

| | | | |
|---|---|---|---|
| 2006/0294219 A1* | 12/2006 | Ogawa | H04L 41/0893 709/224 |
| 2007/0044147 A1 | 2/2007 | Choi et al. | |
| 2007/0097976 A1 | 5/2007 | Wood et al. | |
| 2007/0169179 A1 | 7/2007 | Narad | |
| 2007/0195729 A1 | 8/2007 | Li et al. | |
| 2007/0195797 A1 | 8/2007 | Patel et al. | |
| 2007/0211637 A1 | 9/2007 | Mitchell | |
| 2007/0300061 A1 | 12/2007 | Kim et al. | |
| 2008/0022385 A1* | 1/2008 | Crowell | H04L 63/0263 726/11 |
| 2008/0082662 A1 | 4/2008 | Danliker et al. | |
| 2008/0101234 A1 | 5/2008 | Nakil et al. | |
| 2008/0126534 A1 | 5/2008 | Mueller et al. | |
| 2008/0250122 A1 | 10/2008 | Zsigmond et al. | |
| 2008/0270199 A1 | 10/2008 | Chess et al. | |
| 2008/0301765 A1* | 12/2008 | Nicol | H04L 41/142 726/1 |
| 2009/0064332 A1 | 3/2009 | Porras et al. | |
| 2009/0241170 A1* | 9/2009 | Kumar | H04L 47/10 726/3 |
| 2009/0307753 A1* | 12/2009 | Dupont | H04L 12/2872 726/3 |
| 2009/0313373 A1* | 12/2009 | Hanna | H04L 63/20 709/225 |
| 2009/0313698 A1 | 12/2009 | Wahl | |
| 2009/0328219 A1* | 12/2009 | Narayanaswamy | H04L 63/1425 726/23 |
| 2010/0005288 A1* | 1/2010 | Rao | H04L 1/1854 713/151 |
| 2010/0077445 A1 | 3/2010 | Schneider et al. | |
| 2010/0095293 A1 | 4/2010 | O'Neill et al. | |
| 2010/0095367 A1* | 4/2010 | Narayanaswamy | H04L 63/0245 726/12 |
| 2010/0138810 A1 | 6/2010 | Komatsu et al. | |
| 2010/0148940 A1 | 6/2010 | Gelvin et al. | |
| 2010/0153316 A1* | 6/2010 | Duffield | G06F 21/552 706/12 |
| 2010/0153696 A1 | 6/2010 | Beachem et al. | |
| 2010/0220584 A1* | 9/2010 | DeHaan | H04L 41/0806 370/216 |
| 2010/0235514 A1 | 9/2010 | Beachem | |
| 2010/0235915 A1 | 9/2010 | Memon et al. | |
| 2010/0303240 A1 | 12/2010 | Beachem | |
| 2010/0319060 A1 | 12/2010 | Aiken et al. | |
| 2011/0010585 A1 | 1/2011 | Bugenhagen et al. | |
| 2011/0055381 A1* | 3/2011 | Narasimhan | H04L 41/046 709/224 |
| 2011/0055388 A1 | 3/2011 | Yumerefendi et al. | |
| 2011/0066719 A1 | 3/2011 | Miryanov et al. | |
| 2011/0069685 A1* | 3/2011 | Tofighbakhsh | H04L 41/5067 370/338 |
| 2011/0083125 A1 | 4/2011 | Komatsu et al. | |
| 2011/0126275 A1 | 5/2011 | Anderson et al. | |
| 2011/0145885 A1 | 6/2011 | Rivers et al. | |
| 2011/0170860 A1 | 7/2011 | Smith et al. | |
| 2011/0173490 A1* | 7/2011 | Narayanaswamy | H04L 63/1408 714/4.11 |
| 2011/0185423 A1 | 7/2011 | Sallam | |
| 2011/0196957 A1 | 8/2011 | Ayachitula et al. | |
| 2011/0202655 A1 | 8/2011 | Sharma et al. | |
| 2011/0225207 A1 | 9/2011 | Subramanian et al. | |
| 2011/0228696 A1 | 9/2011 | Agarwal et al. | |
| 2011/0302652 A1 | 12/2011 | Westerfeld | |
| 2011/0314148 A1 | 12/2011 | Petersen et al. | |
| 2012/0005542 A1 | 1/2012 | Petersen et al. | |
| 2012/0079592 A1 | 3/2012 | Pandrangi | |
| 2012/0102361 A1 | 4/2012 | Sass et al. | |
| 2012/0102543 A1* | 4/2012 | Kohli | H04L 63/20 726/1 |
| 2012/0117226 A1 | 5/2012 | Tanaka et al. | |
| 2012/0136996 A1 | 5/2012 | Seo et al. | |
| 2012/0137278 A1* | 5/2012 | Draper | G06F 8/65 717/170 |
| 2012/0140626 A1 | 6/2012 | Anand et al. | |
| 2012/0197856 A1 | 8/2012 | Banka et al. | |
| 2012/0198541 A1 | 8/2012 | Reeves | |
| 2012/0216271 A1 | 8/2012 | Cooper et al. | |
| 2012/0233473 A1 | 9/2012 | Vasseur et al. | |
| 2012/0240232 A1* | 9/2012 | Azuma | H04L 63/10 726/24 |
| 2012/0246303 A1 | 9/2012 | Petersen et al. | |
| 2012/0278021 A1 | 11/2012 | Lin et al. | |
| 2013/0003538 A1 | 1/2013 | Greenburg et al. | |
| 2013/0006935 A1 | 1/2013 | Grisby | |
| 2013/0038358 A1 | 2/2013 | Cook et al. | |
| 2013/0086272 A1 | 4/2013 | Chen et al. | |
| 2013/0103827 A1 | 4/2013 | Dunlap et al. | |
| 2013/0145099 A1 | 6/2013 | Liu et al. | |
| 2013/0159999 A1 | 6/2013 | Chiueh et al. | |
| 2013/0179487 A1 | 7/2013 | Lubetzky et al. | |
| 2013/0179879 A1 | 7/2013 | Zhang et al. | |
| 2013/0198839 A1 | 8/2013 | Wei et al. | |
| 2013/0246925 A1* | 9/2013 | Ahuja | H04L 63/1416 715/738 |
| 2013/0247201 A1 | 9/2013 | Alperovitch et al. | |
| 2013/0254879 A1 | 9/2013 | Chesla et al. | |
| 2013/0268994 A1* | 10/2013 | Cooper | H04L 63/10 726/1 |
| 2013/0275579 A1* | 10/2013 | Hernandez | H04L 67/22 709/224 |
| 2013/0283374 A1 | 10/2013 | Zisapel et al. | |
| 2013/0290521 A1 | 10/2013 | Labovitz | |
| 2013/0297771 A1 | 11/2013 | Osterloh et al. | |
| 2013/0304900 A1 | 11/2013 | Trabelsi et al. | |
| 2013/0305369 A1 | 11/2013 | Karta et al. | |
| 2013/0318357 A1 | 11/2013 | Abraham et al. | |
| 2013/0326623 A1 | 12/2013 | Kruglick | |
| 2013/0333029 A1 | 12/2013 | Chesla et al. | |
| 2013/0347103 A1 | 12/2013 | Veteikis et al. | |
| 2014/0006610 A1 | 1/2014 | Formby et al. | |
| 2014/0006871 A1 | 1/2014 | Lakshmanan et al. | |
| 2014/0012814 A1 | 1/2014 | Bercovici et al. | |
| 2014/0033193 A1 | 1/2014 | Palaniappan | |
| 2014/0047185 A1 | 2/2014 | Peterson et al. | |
| 2014/0047372 A1 | 2/2014 | Gnezdov et al. | |
| 2014/0059200 A1 | 2/2014 | Nguyen et al. | |
| 2014/0089494 A1 | 3/2014 | Dasari et al. | |
| 2014/0096058 A1 | 4/2014 | Molesky et al. | |
| 2014/0115219 A1 | 4/2014 | Ajanovic et al. | |
| 2014/0143825 A1 | 5/2014 | Behrendt et al. | |
| 2014/0149490 A1 | 5/2014 | Luxenberg et al. | |
| 2014/0156814 A1 | 6/2014 | Barabash et al. | |
| 2014/0164607 A1 | 6/2014 | Bai et al. | |
| 2014/0173623 A1 | 6/2014 | Chang et al. | |
| 2014/0192639 A1 | 7/2014 | Smirnov | |
| 2014/0201717 A1 | 7/2014 | Mascaro et al. | |
| 2014/0215573 A1 | 7/2014 | Cepuran | |
| 2014/0215621 A1 | 7/2014 | Xaypanya et al. | |
| 2014/0281030 A1 | 9/2014 | Cui et al. | |
| 2014/0289854 A1 | 9/2014 | Mahvi | |
| 2014/0298461 A1 | 10/2014 | Hohndel et al. | |
| 2014/0317737 A1 | 10/2014 | Shin et al. | |
| 2014/0331276 A1 | 11/2014 | Frascadore | |
| 2014/0331280 A1 | 11/2014 | Porras et al. | |
| 2014/0331304 A1 | 11/2014 | Wong | |
| 2014/0351203 A1 | 11/2014 | Kunnatur et al. | |
| 2014/0351415 A1 | 11/2014 | Harrigan et al. | |
| 2014/0359695 A1 | 12/2014 | Chari et al. | |
| 2015/0009840 A1 | 1/2015 | Pruthi et al. | |
| 2015/0033305 A1 | 1/2015 | Shear et al. | |
| 2015/0036533 A1 | 2/2015 | Sodhi et al. | |
| 2015/0039751 A1 | 2/2015 | Harrigan et al. | |
| 2015/0046882 A1 | 2/2015 | Menyhart et al. | |
| 2015/0058976 A1 | 2/2015 | Carney et al. | |
| 2015/0067143 A1 | 3/2015 | Babakhan et al. | |
| 2015/0082151 A1 | 3/2015 | Liang et al. | |
| 2015/0085665 A1 | 3/2015 | Kompella et al. | |
| 2015/0095332 A1 | 4/2015 | Beisiegel et al. | |
| 2015/0112933 A1 | 4/2015 | Satapathy | |

(56) References Cited

U.S. PATENT DOCUMENTS

| | | | |
|---|---|---|---|
| 2015/0113133 A1 | 4/2015 | Srinivas et al. | |
| 2015/0124608 A1 | 5/2015 | Agarwal et al. | |
| 2015/0138993 A1 | 5/2015 | Forster et al. | |
| 2015/0142962 A1 | 5/2015 | Srinivas | |
| 2015/0195291 A1 | 7/2015 | Zuk et al. | |
| 2015/0249622 A1 | 9/2015 | Phillips et al. | |
| 2015/0256555 A1 | 9/2015 | Choi et al. | |
| 2015/0261842 A1* | 9/2015 | Huang | G06F 17/30595 707/758 |
| 2015/0261886 A1 | 9/2015 | Wu et al. | |
| 2015/0271255 A1 | 9/2015 | Mackay et al. | |
| 2015/0295945 A1 | 10/2015 | Canzanese, Jr. et al. | |
| 2015/0347554 A1 | 12/2015 | Vasantham et al. | |
| 2015/0358352 A1 | 12/2015 | Chasin et al. | |
| 2016/0006753 A1 | 1/2016 | McDaid et al. | |
| 2016/0021131 A1 | 1/2016 | Heilig | |
| 2016/0026552 A1 | 1/2016 | Holden et al. | |
| 2016/0036837 A1 | 2/2016 | Jain et al. | |
| 2016/0050132 A1 | 2/2016 | Zhang et al. | |
| 2016/0072815 A1* | 3/2016 | Rieke | H04L 63/1433 726/3 |
| 2016/0103692 A1 | 4/2016 | Guntaka et al. | |
| 2016/0105350 A1 | 4/2016 | Greifeneder et al. | |
| 2016/0119234 A1* | 4/2016 | Valencia Lopez | H04L 45/745 370/401 |
| 2016/0127395 A1 | 5/2016 | Underwood et al. | |
| 2016/0147585 A1 | 5/2016 | Konig et al. | |
| 2016/0162308 A1 | 6/2016 | Chen et al. | |
| 2016/0162312 A1 | 6/2016 | Doherty et al. | |
| 2016/0205002 A1 | 7/2016 | Rieke et al. | |
| 2016/0216994 A1 | 7/2016 | Sefidcon et al. | |
| 2016/0294691 A1 | 10/2016 | Joshi | |
| 2016/0308908 A1* | 10/2016 | Kirby | H04L 63/02 |
| 2016/0357424 A1 | 12/2016 | Pang et al. | |
| 2016/0357546 A1 | 12/2016 | Chang et al. | |
| 2016/0357587 A1 | 12/2016 | Yadav et al. | |
| 2016/0357957 A1 | 12/2016 | Deen et al. | |
| 2016/0359592 A1 | 12/2016 | Kulshreshtha et al. | |
| 2016/0359628 A1 | 12/2016 | Singh et al. | |
| 2016/0359658 A1 | 12/2016 | Yadav et al. | |
| 2016/0359673 A1 | 12/2016 | Gupta et al. | |
| 2016/0359677 A1 | 12/2016 | Kulshreshtha et al. | |
| 2016/0359678 A1 | 12/2016 | Madani et al. | |
| 2016/0359679 A1 | 12/2016 | Parasdehgheibi et al. | |
| 2016/0359680 A1 | 12/2016 | Parasdehgheibi et al. | |
| 2016/0359686 A1 | 12/2016 | Parasdehgheibi et al. | |
| 2016/0359696 A1 | 12/2016 | Yadav et al. | |
| 2016/0359697 A1 | 12/2016 | Scheib et al. | |
| 2016/0359698 A1 | 12/2016 | Deen et al. | |
| 2016/0359699 A1 | 12/2016 | Gandham et al. | |
| 2016/0359700 A1 | 12/2016 | Pang et al. | |
| 2016/0359701 A1 | 12/2016 | Pang et al. | |
| 2016/0359703 A1 | 12/2016 | Gandham et al. | |
| 2016/0359704 A1 | 12/2016 | Gandham et al. | |
| 2016/0359705 A1 | 12/2016 | Parandehgheibi et al. | |
| 2016/0359708 A1 | 12/2016 | Gandham et al. | |
| 2016/0359709 A1 | 12/2016 | Deen et al. | |
| 2016/0359711 A1 | 12/2016 | Deen et al. | |
| 2016/0359712 A1 | 12/2016 | Alizadeh Attar et al. | |
| 2016/0359740 A1 | 12/2016 | Parandehgheibi et al. | |
| 2016/0359759 A1 | 12/2016 | Singh et al. | |
| 2016/0359872 A1 | 12/2016 | Yadav et al. | |
| 2016/0359877 A1 | 12/2016 | Kulshreshtha et al. | |
| 2016/0359878 A1 | 12/2016 | Prasad et al. | |
| 2016/0359879 A1 | 12/2016 | Deen et al. | |
| 2016/0359880 A1 | 12/2016 | Pang et al. | |
| 2016/0359881 A1 | 12/2016 | Yadav et al. | |
| 2016/0359888 A1 | 12/2016 | Gupta et al. | |
| 2016/0359889 A1 | 12/2016 | Yadav et al. | |
| 2016/0359890 A1 | 12/2016 | Deen et al. | |
| 2016/0359891 A1 | 12/2016 | Pang et al. | |
| 2016/0359897 A1 | 12/2016 | Yadav et al. | |
| 2016/0359912 A1 | 12/2016 | Gupta et al. | |
| 2016/0359913 A1 | 12/2016 | Gupta et al. | |
| 2016/0359914 A1 | 12/2016 | Deen et al. | |
| 2016/0359917 A1 | 12/2016 | Rao et al. | |
| 2016/0373481 A1* | 12/2016 | Sultan | H04L 63/1433 |
| 2017/0034018 A1 | 2/2017 | Parandehgheibi et al. | |
| 2018/0006911 A1 | 1/2018 | Dickey | |

FOREIGN PATENT DOCUMENTS

| | | |
|---|---|---|
| CN | 102521537 | 6/2012 |
| CN | 103023970 | 4/2013 |
| CN | 103716137 | 4/2014 |
| CN | 104065518 | 9/2014 |
| EP | 0811942 | 12/1997 |
| EP | 1383261 | 1/2004 |
| EP | 1450511 | 8/2004 |
| EP | 2045974 A1 | 4/2009 |
| EP | 2887595 | 6/2015 |
| JP | 2009-016906 | 1/2009 |
| KR | 1394338 | 5/2014 |
| WO | WO 2007/014314 | 2/2007 |
| WO | WO 2007/070711 | 6/2007 |
| WO | WO 2008/069439 | 6/2008 |
| WO | WO 2013/030830 | 3/2013 |
| WO | WO 2015/042171 | 3/2015 |
| WO | WO 2016/004075 | 1/2016 |
| WO | WO 2016/019523 | 2/2016 |

OTHER PUBLICATIONS

Breen, Christopher, "MAC 911, How to dismiss Mac App Store Notifications," Macworld.com, Mar. 24, 2014, 3 pages.

Chou, C.W., et al., "Optical Clocks and Relativity," Science vol. 329, Sep. 24, 2010, pp. 1630-1633.

Huang, Hing-Jie, et al., "Clock Skew Based Node Identification in Wireless Sensor Networks," IEEE, 2008, 5 pages.

Ives, Herbert, E., et al., "An Experimental Study of the Rate of a Moving Atomic Clock," Journal of the Optical Society of America, vol. 28, No. 7, Jul. 1938, pp. 215-226.

Witze, Alexandra, "Special relativity aces time trial, 'Time dilation' predicted by Einstein confirmed by lithium ion experiment," Nature, Sep. 19, 2014, 3 pages.

Zatrochova, Zuzana, "Analysis and Testing of Distributed NoSQL Datastore Riak," Spring, 2015, 76 pages.

International Search Report & Written Opinion dated Aug. 10, 2016 for corresponding PCT Application No. PCT/US2016/03531.

Kerrison, Adam, et al., "Four Steps to Faster, Better Application Dependency Mapping—Laying the Foundation for Effective Business Service Models," BMCSoftware, 2011.

Chen, Xu, et al., "Automating network application dependency discovery: experiences, limitations, and new solutions," 8th USENIX conference on Operating systems design and implementation (OSDI'08), USENIX Association, Berkeley, CA, USA, 117-130.

Chandran, Midhun, et al., "Monitoring in a Virtualized Environment." GSTF International Journal on Computing, vol. 1, No. 1, Aug. 2010.

Blair, Dana, et al., U.S. Appl. No. 62/106,006, filed Jan. 21, 2015, entitled "Monitoring Network Policy Compliance".

Australian Government Department of Defence, Intelligence and Security, "Top 4 Strategies to Mitigate Targeted Cyber Intrusions," Cyber Security Operations Centre Jul. 2013, http://www.asd.gov.au/infosec/top-mitigations/top-4-strategies-explained.htm.

Cisco Systems, Inc., "Addressing Compliance from One Infrastructure: Cisco Unified Compliance Solution Framework," 2014.

Cisco Systems, Inc., "White Paper—New Cisco Technologies Help Customers Achieve Regulatory Compliance," 1992-2008.

Janoff, Christian, et al., "Cisco Compliance Solution for HIPAA Security Rule Design and Implementation Guide," Cisco Systems, Inc., Updated Nov. 14, 2015.

Aydin, Galip, et al., "Architecture and Implementation of a Scalable Sensor Data Storage and Analysis Using Cloud Computing and Big Data Technologies," Journal of Sensors, vol. 2015, Article ID 834217, Feb. 2015, 11 pages.

Backes, Michael, et al., "Data Lineage in Malicious Environments," IEEE 2015, pp. 1-13.

(56) References Cited

OTHER PUBLICATIONS

Bayati, Mohsen, et al., "Message-Passing Algorithms for Sparse Network Alignment," Mar. 2013, 31 pages.
Berezinski, Przemyslaw, et al., "An Entropy-Based Network Anomaly Detection Method," Entropy, 2015, vol. 17, www.mdpi.com/journal/entropy, pp. 2367-2408.
Berthier, Robin, et al. "Nfsight: Netflow-based Network Awareness Tool," 2010, 16 pages.
Bhuyan, Dhiraj, "Fighting Bots and Botnets," 2006, pp. 23-28.
Chari, Suresh, et al., "Ensuring continuous compliance through reconciling policy with usage," Proceedings of the 18$^{th}$ ACM symposium on Access control models and technologies (SACMAT '13). ACM, New York, NY, USA, 49-60.
Cisco Systems, Inc., "Cisco Application Dependency Mapping Service," 2009.
Cisco Systems, Inc., "A Cisco Guide to Defending Against Distributed Denial of Service Attacks," May 3, 2016, 34 pages.
Cisco Technology, Inc., "Cisco Lock-and-Key:Dynamic Access Lists," http://www/cisco.com/c/en/us/support/docs/security-vpn/lock-key/7604-13.html; Updated Jul. 12, 2006, 16 pages.
Di Lorenzo, Guisy, et al., "EXSED: An Intelligent Tool for Exploration of Social Events Dynamics from Augmented Trajectories," Mobile Data Management (MDM), pp. 323-330, Jun. 3-6, 2013.
Feinstein, Laura, et al., "Statistical Approaches to DDoS Attack Detection and Response," Proceedings of the DARPA Information Survivability Conference and Exposition (DISCEX '03), Apr. 2003, 12 pages.
George, Ashley, et al., "NetPal: A Dynamic Network Administration Knowledge Base," 2008, pp. 1-14.
Goldsteen, Abigail, et al., "A Tool for Monitoring and Maintaining System Trustworthiness at Run Time," REFSQ (2015), pp. 142-147.
Hamadi, S., et al., "Fast Path Acceleration for Open vSwitch in Overlay Networks," Global Information Infrastructure and Networking Symposium (GIIS), Montreal, QC, pp. 1-5, Sep. 15-19, 2014.
Hewlett-Packard, "Effective use of reputation intelligence in a security operations center," Jul. 2013, 6 pages.
Hideshima, Yusuke, et al., "Starmine: A Visualization System for Cyber Attacks," https://www.researchgate.net/publication/221536306, Feb. 2006, 9 pages.
InternetPerils, Inc., "Control Your Internet Business Risk," 2003-2015, https://www.internetperils.com.
Kraemer, Brian, "Get to know your data center with CMDB," TechTarget, Apr. 5, 2006, http://searchdatacenter.techtarget.com/news/118820/Get-to-know-your-data-center-with-CMDB.
Lab SKU, "VMware Hands-on Labs—HOL-SDC-1301" Version: 20140321-160709, 2013; http://docs.hol.vmare.com/HOL-2013/holsdc-1301_html_en/ (part 1 of 2).
Lab SKU, "VMware Hands-on Labs—HOL-SDC-1301" Version: 20140321-160709, 2013; http://docs.hol.vmare.com/HOL-2013/holsdc-1301_html_en/ (part 2 of 2).
Lachance, Michael, "Dirty Little Secrets of Application Dependency Mapping," Dec. 26, 2007.
Landman, Yoav, et al., "Dependency Analyzer," Feb. 14, 2008, http://jfrog.com/confluence/display/DA/Home.
Lee, Sihyung, "Reducing Complexity of Large-Scale Network Configuration Management," Ph.D. Dissertation, Carniege Mellon University, 2010.
Li, Ang, et al., "Fast Anomaly Detection for Large Data Centers," Global Telecommunications Conference (GLOBECOM 2010, Dec. 2010, 6 pages.
Li, Bingbong, et al, "A Supervised Machine Learning Approach to Classify Host Roles on Line Using sFlow," in Proceedings of the first edition workshop on High performance and programmable networking, 2013, ACM, New York, NY, USA, 53-60.
Liu, Ting, et al., "Impala: A Middleware System for Managing Autonomic, Parallel Sensor Systems," In Proceedings of the Ninth ACM SIGPLAN Symposium on Principles and Practice of Parallel Programming(PPoPP '03), ACM, New York, NY, USA, Jun. 11-13, 2003, pp. 107-118.
Lu, Zhonghai, et al., "Cluster-based Simulated Annealing for Mapping Cores onto 2D Mesh Networks on Chip," Design and Diagnostics of Electronic Circuits and Systems, pp. 1, 6, 16-18, Apr. 2008.
Matteson, Ryan, "Depmap: Dependency Mapping of Applications Using Operating System Events: a Thesis," Master's Thesis, California Polytechnic State University, Dec. 2010.
Natarajan, Arun, et al., "NSDMiner: Automated Discovery of Network Service Dependencies," Institute of Electrical and Electronics Engineers INFOCOM, Feb. 2012, 9 pages.
Navaz, A.S. Syed, et al., "Entropy based Anomaly Detection System to Prevent DDoS Attacks in Cloud," International Journal of computer Applications (0975-8887), vol. 62, No. 15, Jan. 2013, pp. 42-47.
Neverfail, "Neverfail IT Continuity Architect," 2015, https://web.archive.org/web/20150908090456/http://neverfailgroup.com/products/it-continuity-architect.
Nilsson, Dennis K., et al., "Key Management and Secure Software Updates in Wireless Process Control Environments," In Proceedings of the First ACM Conference on Wireless Network Security (WiSec '08), ACM, New York, NY, USA, Mar. 31-Apr. 2, 2008, pp. 100-108.
Nunnally, Troy, et al., "P3D: A Parallel 3D Coordinate Visualization for Advanced Network Scans," IEEE 2013, Jun. 9-13, 2013, 6 pages.
O'Donnell, Glenn, et al., "The CMDB Imperative: How to Realize the Dream and Avoid the Nightmares," Prentice Hall, Feb. 19, 2009.
Ohta, Kohei, et al., "Detection, Defense, and Tracking of Internet-Wide Illegal Access in a Distributed Manner," 2000, pp. 1-16.
Pathway Systems International Inc., "How Blueprints does Integration," Apr. 15, 2014, 9 pages, http://pathwaysystems.com/company-blog/.
Pathway Systems International Inc., "What is Blueprints?" 2010-2016, http://pathwaysystems.com/blueprints-about/.
Popa, Lucian, et al., "Macroscope: End-Point Approach to Networked Application Dependency Discovery," CoNEXT'09, Dec. 1-4, 2009, Rome, Italy, 12 pages.
Prasad, K. Munivara, et al., "An Efficient Detection of Flooding Attacks to Internet Threat Monitors (ITM) using Entropy Variations under Low Traffic," Computing Communication & Networking Technologies (ICCCNT '12), Jul. 26-28, 2012, 11 pages.
Sachan, Mrinmaya, et al., "Solving Electrical Networks to incorporate Supervision in Random Walks," May 13-17, 2013, pp. 109-110.
Sammarco, Matteo, et al., "Trace Selection for Improved WLAN Monitoring," Aug. 16, 2013, pp. 9-14.
Shneiderman, Ben, et al., "Network Visualization by Semantic Substrates," Visualization and Computer Graphics, vol. 12, No. 5, pp. 733,740, Sep.-Oct. 2006.
Wang, Ru, et al., "Learning directed acyclic graphs via bootstarp aggregating," 2014, 47 pages, http://arxiv.org/abs/1406.2098.
Wang, Yongjun, et al., "A Network Gene-Based Framework for Detecting Advanced Persistent Threats," Nov. 2014, 7 pages.
Woodberg, Brad, "Snippet from Juniper SRX Series" Jun. 17, 2013, 1 page, O'Reilly Media, Inc.
Zhang, Yue, et al., "CANTINA: A Content-Based Approach to Detecting Phishing Web Sites," May 8-12, 2007, pp. 639-648.
Bauch, Petr, "Reader's Report of Master's Thesis, Analysis and Testing of Distributed NoSQL Datastore Riak," May 28, 2015, Brno. 2 pages.
Heckman, Sarah, et al., "On Establishing a Benchmark for Evaluating Static Analysis Alert Prioritization and Classification Techniques," IEEE, 2008; 10 pages.
Kim, Myung-Sup, et al. "A Flow-based Method for Abnormal Network Traffic Detection," IEEE, 2004, pp. 599-612.
Thomas, R., "Bogon Dotted Decimal List," Version 7.0, Team Cymru NOC, Apr. 27, 2012, 5 pages.

* cited by examiner

| Compliance 302 | HIPAA 304 | SOX 306 | PCI DSS 308 |
|---|---|---|---|
| 310 Security Management Process | 164.308(a)(1)(i) | CA (DS5) Monitoring<br>CE (ME12) Internal Control Program | 12.1, 12.1.1, 12.1.1, 12.1.3, 12.2, 12.6, 12.9, 12.9.1, 12.9.2, 12.9.3, 12.9.4, NA – ALL |
| 312 Risk Analysis | 164.308(a)(1)(ii)(A) | CA (A16) Risk Assessment | |
| 314 Risk Management | 164.308(a)(1)(ii)(B) | CA (A16) Risk Assessment | |
| 316 Information System Activity Review | 164.308(a)(1)(ii)(D) | CA (DS5) Monitoring | 10.2.7 (Y), 10.3, 10.3.1 (Y), 10.3.2 (Y), 10.3.3 (Y), 10.3.4 (Y), 10.3.5 (Y), 10.3.6 (Y), 10.6, 11.5, 12.9.6 |
| 318 Assigned Security Responsibility | 164.308(a)(2) | CA (DS5) Monitoring | |
| 320 Authorization and/or Supervision | 164.308(a)(3)(ii)(A) | | 2.2.3, 7.1.4 (Y), 7.2, 7.2.3 (Y), 8.2 (Y), 8.5.1, 8.5.16, 10.2.7 (Y), 10.3, 10.3.1 (Y), 10.3.2 (Y), 10.3.3 (Y), 10.3.4 (Y), 10.3.5 (Y), 10.3.6 (Y), 10.6, 11.5 |
| 322 Termination Procedures | 164.308(a)(3)(ii)(C) | | 8.2 (Y), 8.5.1, 8.5.16 |
| 324 Isolating Health Care Clearinghouse Function | 164.308(a)(4)(ii)(A) | | 2.1.1, 2.2.3, 6.6, 7.1.4 (Y), 12.8.2 |
| 326 Access Authorization | 164.308(a)(4)(ii)(B) | | 2.2.3, 7.1.4 (Y), 7.2, 7.2.3 (Y), 8.2 (Y), 8.5.1, 8.5.16 |
| 328 Access Establishment and Modification | 164.308(a)(4)(ii)(C) | | 8.2 (Y), 8.5.1, 8.5.16 |
| 330 Protection from Malicious Software | 164.308(a)(5)(ii)(B) | CA (DS9) Manage Configuration | 5.1, 5.1.1, 5.2, NA – ALL |
| 332 Log-in Monitoring | 164.308(a)(5)(ii)(C) | CA (DS5) Monitoring | 10.1 (Y), 10.2, 10.2.1 (Y), 10.2.5 (Y), 10.2.7 (Y), 10.3, 10.3.1 (Y), 10.3.2 (Y), 10.3.3 (Y), 10.3.4 (Y), 10.3.5 (Y), 10.3.6 (Y), 10.5.4 (Y), 10.6, 11.5 |
| 334 Password Management | 164.308(a)(5)(ii)(D) | | 2.1, 2.1.1, 8.4 (Y), 8.5, 8.5.2, 8.5.3, 8.5.7, 8.5.8 (Y), 8.5.9 (Y), 8.5.10 (Y), 8.5.11 (Y), 8.5.12 (Y), 8.5.13 (Y), 8.5.14 (Y) |
| 336 Response and Reporting | 164.308(a)(6)(ii) | CA (DS5) Monitoring | 12.6, 12.9, 12.9.1, 12.9.2, 12.9.3, 12.9.4, 12.9.6, NA – ALL |
| 338 Contingency Plan | 164.308(a)(7)(i) | | 9.1.1 NA |
| 340 Evaluation | 164.308(a)(8) | CA (DS5) Monitoring | 11.3, 12.1, 12.1.1, 12.1.2, 12.1.3, 12.2, NA – ALL |
| 342 Facility Access Control and Validation Procedures | 164.310(a)(2)(iii) | CA (DS12) Physical Security | NA |
| 344 Unique User Identification | 164.312(a)(2)(i) | | 3.2, 8.1 (Y), 8.2 (Y), 8.5.1, 8.5.8 (Y), 8.5.16, 12.3.2 |
| 346 Emergency Access Procedure | 164.312(a)(2)(ii) | | 7.1.4 (Y) |
| 348 Automatic Logoff | 164.312(a)(2)(iii) | | 8.5.15 (Y), 12.3.8 |
| 350 Encryption and Decryption | 164.312(a)(2)(iv) | | 3.5, 3.5.1, 3.5.2, 3.6, 3.6.1, 3.6.2, 3.6.3, 3.6.4, 3.6.5, 3.6.6, 3.6.7, 3.6.8, NA – ALL |
| 352 Audit Controls | 164.312(b) | | 10.1 (Y), 10.2, 10.2.1 (Y), 10.2.5 (Y), 10.2.7 (Y), 10.3, 10.3.1 (Y), 10.3.2 (Y), 10.3.3 (Y), 10.3.4 (Y), 10.3.5 (Y), 10.3.6 (Y), 10.5.4 (Y), 10.6, 11.5 |
| 354 Data Integrity | 164.312(c)(1) | CA (DS9) Manage Configuration | 2.3, 4.1 (Y), 4.1.1 (Y) |
| 356 Person or Entity Authentication | 164.312(d) | | 3.2, 8.1 (Y), 8.2 (Y), 8.5.1, 8.5.8 (Y), 8.5.16, 12.3.2 |
| 358 Integrity Controls | 164.312(e)(2)(i) | | 2.1.1, 4.1 Y, 4.1.1 |

FIG. 3

POLICY-DRIVEN COMPLIANCE

CROSS-REFERENCE TO RELATED APPLICATION

This application claims priority to U.S. Provisional Application 62/171,899, titled System for Monitoring and Managing Datacenters and filed at Jun. 5, 2015, the disclosure of which is incorporated herein by reference in its entirety.

TECHNICAL FIELD

The present technology pertains to compliance and more specifically pertains to effecting compliance via network policies.

BACKGROUND

Network attacks are becoming increasingly sophisticated and malicious, and the risk of data breaches and their consequences grows. Failure to thwart attacks can damage a business's reputation and result in loss of revenue. In addition, governments and other authoritative bodies are taking on a more active role in protecting individual's sensitive electronic information. For example, in the United States and abroad, statutes and standards such as the Health Insurance Portability and Accountability Act (HIPAA), Sarbanes Oxley (SOX), and the Payment Card Industry Data Security Standard (PCI DSS) have been put in place for enterprises to take appropriate steps to ensure the proper use and protection of both corporate and personal communications and information. These regulations and standards are often backed by financial penalties for public or private organizations that fail to comply or where personal data is actually breached.

Compliance can be a state of comporting with governmental regulations, industry standards, and similar guidelines, or the process toward this state. Conventional approaches for compliance may be inadequate to the challenges facing networks today. Many solutions tend to focus on the network edge (i.e., north-south traffic). Thus, networks using these solutions may be especially vulnerable to attacks occurring within the network (i.e., east-west traffic) and are likely to be non-compliant. Conventional techniques are also typically reactive and cannot resolve security breaches in real time or substantially real time. In addition, conventional networks often fail to gather all relevant information for preventing, diagnosing, and remedying malicious network activity.

BRIEF DESCRIPTION OF THE FIGURES

In order to describe the manner in which the above-recited and other advantages and features of the disclosure can be obtained, a more particular description of the principles briefly described above will be rendered by reference to specific embodiments that are illustrated in the appended drawings. Understanding that these drawings depict only example embodiments of the disclosure and are not therefore to be considered to be limiting of its scope, the principles herein are described and explained with additional specificity and detail through the use of the accompanying drawings in which:

FIG. 3 illustrates a compliance mapping in accordance with an example embodiment;

DESCRIPTION OF EXAMPLE EMBODIMENTS

Figure 1:
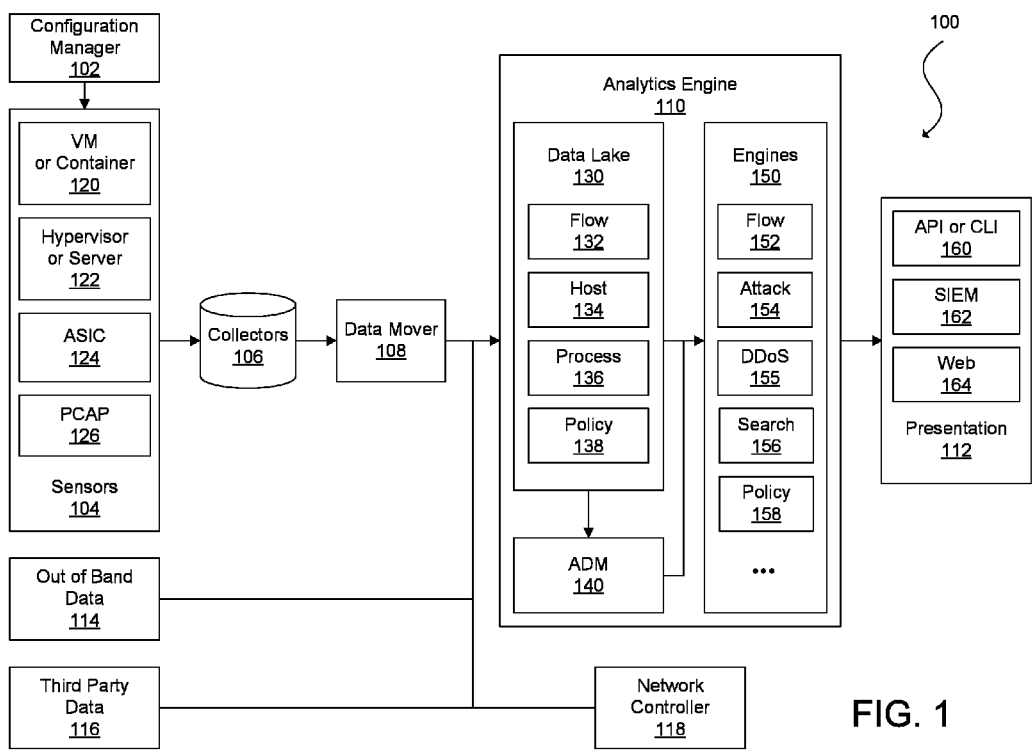
FIG. 1 illustrates a network traffic monitoring system in accordance with an example embodiment.

The detailed description set forth below is intended as a description of various configurations of example embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

Overview

A network can achieve compliance by defining and enforcing a set of network policies to secure electronic information subject to a governmental regulation or an industry standard (i.e., protected electronic information). The network can monitor network information, host and/or endpoint information, process information, and user information for traffic passing through the network using a sensor network that provides multiple perspectives for the traffic. The sensor network can include sensors for networking devices, physical servers, hypervisors or shared kernels, and virtual partitions (e.g., virtual machines (VMs) or containers), and other network elements. The network can analyze the network information, host and/or endpoint information, process information, and user information to determine one or more policies for each flow. The network can determine an expected network action based on the policies for the flow. These network actions can include forwarding traffic, dropping traffic, marking traffic for a particular quality of service (QoS), redirecting traffic using a specific route, and selecting a service graph for traffic (e.g., forwarding traffic through a set of network service functions, such as a firewall, load balancer, wide area network (WAN) optimizer, among other network services). The network can update policy information based on comparisons between expected network actions to be performed on the traffic and actual network actions performed on the traffic. The policy information can be utilized for compliance reporting or investigating policy non-conformance.

Description

Various embodiments of the disclosure are discussed in detail below. While specific implementations are discussed, it should be understood that this is done for illustrative purposes only. A person skilled in the relevant art will recognize that other components and configurations may be used without departing from the spirit and scope of the disclosure.

Systems and approaches in accordance with various embodiments of the present technology may overcome the foregoing and other limitations with conventional techniques by collecting, from multiple perspectives, a more thorough data set for analyzing compliance; designing dynamic network policies that account for the current states of hosts and/or endpoints, processes, and users; and tracking both conformance and non-conformance of network policies.

Conventional compliance solutions are traditionally limited to packet data captured by networking devices. In some example embodiments, networks can be configured with sensors at multiple points, including on networking devices (e.g., switches, routers, gateways, firewalls, deep packet inspectors, traffic monitors, load balancers, etc.), physical servers, hypervisors or shared kernels, virtual partitions (e.g., VMs or containers), and other network elements. This can provide a more comprehensive view of the network. Further, network traffic data (e.g., flows) can be associated with host and/or endpoint data (e.g., host/endpoint name, operating system, CPU usage, network usage, disk space, logged users, scheduled jobs, open files, information regarding files stored on a host/endpoint, etc.), process data (e.g., process name, ID, parent process ID, path, CPU utilization, memory utilization, etc.), user data (e.g., user name, ID, login time, etc.), and other collectible data to provide more insight into network activity.

Conventional approaches to compliance are also limited to static policies or rules such as access control lists (ACLs). For example, conventional network policies are an "Allow" rule for forwarding incoming traffic corresponding to a source address or a "Deny" rule for dropping incoming traffic. When the state of the endpoint changes and the traffic is to be permitted or denied, there can be a delay because conventional networks typically require manual intervention to change the appropriate policies. Further, propagating new policies throughout the network can compound the delay. In various example embodiments, networks can employ dynamic policies based on the state of a host and/or endpoint, process, and/or user associated with a flow. Networks can initially associate traffic with a first endpoint group (EPG) and then reassign traffic to one or more second EPGs if a host and/or endpoint state, process state, or user state changes.

Compliance addresses the areas of confidentiality, integrity, availability, and auditability. Confidentiality tackles the challenges of protecting data as it traverses the network, limiting interception of data, and—in the event of interception—limiting usability of data by unauthorized persons. Integrity pertains to protection of data against improper alteration or destruction, and ensures that data is accurate and complete, and that accuracy and completeness are maintained. Availability is directed toward providing access to data by authorized persons at specified times. Auditability concerns providing proof that a network conforms to regulations, standards, and similar guidelines. Conventional compliance solutions often fail to address one or more of these aspects of compliance. For example, to the extent conventional networks are capable of monitoring security threats, these networks are incapable of verifying no security threat occurred. In various example embodiments, networks can monitor, log, and report compliance and non-compliance.

Referring now to the drawings, FIG. 1 is an illustration of a network traffic monitoring system 100 in accordance with an example embodiment. The network traffic monitoring system 100 can include a configuration manager 102, sensors 104, a collector module 106, a data mover module 108, an analytics engine 110, and a presentation module 112. In an example embodiment of FIG. 1, the analytics engine 110 is also shown in communication with out-of-band data sources 114, third party data sources 116, and a network controller 118.

The configuration manager 102 can be used to provision and maintain the sensors 104, including installing sensor software or firmware in various nodes of a network, configuring the sensors 104, updating the sensor software or firmware, among other sensor management tasks. For example, the sensors 104 can be implemented as virtual partition images (e.g., virtual machine (VM) images or container images), and the configuration manager 102 can distribute the images to host machines. In general, a virtual partition may be an instance of a VM, container, sandbox, or other isolated software environment. The software environment may include an operating system and application software. For software running within a virtual partition, the virtual partition may appear to be, for example, one of many servers or one of many operating systems executed on a single physical server. The configuration manager 102 can instantiate a new virtual partition or migrate an existing partition to a different physical server. The configuration manager 102 can also be used to configure the new or migrated sensor.

The configuration manager 102 can monitor the health of the sensors 104. For instance, the configuration manager 102 may request for status updates and/or receive heartbeat messages, initiate performance tests, generate health checks, and perform other health monitoring tasks. In an example embodiment, the configuration manager 102 can also authenticate the sensors 104. For example, the sensors 104 can be assigned a unique identifier, such as by using a one-way hash function of a sensor's basic input/out system (BIOS) universally unique identifier (UUID) and a secret key stored by the configuration image manager 102. The UUID can be a large number that may be difficult for a malicious sensor or other device or component to guess. In an example embodiment, the configuration manager 102 can keep the sensors 104 up to date by installing the latest versions of sensor software and/or applying patches. The configuration manager 102 can obtain these updates automatically from a local source or the Internet.

The sensors 104 can reside on various nodes of a network, such as a virtual partition (e.g., VM or container) 120; a hypervisor or shared kernel managing one or more virtual partitions and/or physical servers 122, an application-specific integrated circuit (ASIC) 124 of a switch, router, gateway, or other networking device, or a packet capture (pcap) 126 appliance (e.g., a standalone packet monitor, a device connected to a network devices monitoring port, a device connected in series along a main trunk of a datacenter, or similar device) or other component of a network operating system. The sensors 104 can monitor network traffic between nodes, and send network traffic data and corresponding data (e.g., host data, process data, user data, etc.) to the collectors 108 for storage. For example, the sensors 104 can sniff packets being sent over its hosts' physical or virtual network interface card (NIC), or individual processes can be configured to report network traffic and corresponding data to the sensors 104. Incorporating the sensors 104 on multiple nodes and within multiple partitions of some nodes of the network can provide for robust capture of network traffic and corresponding data. In an example embodiment, each node of the network (e.g., VM, container, or other virtual partition 120, hypervisor, shared kernel, or physical server 122, ASIC 124, pcap 126, etc.) includes a respective sensor 104. However, it should be understood that various software and hardware configurations can be used to implement the sensor network 104.

As the sensors 104 capture communications and corresponding data, they may continuously send network traffic and corresponding data to the collectors 108. The network traffic data can include metadata relating to a packet, a collection of packets, a flow, a group of flows, etc. That is, the network traffic data can generally include any information describing communication on all layers of the Open Systems Interconnection (OSI) model. For example, the network traffic data can include source/destination MAC address, source/destination IP address, protocol, port number, etc. In some example embodiments, the network traffic data can also include summaries of network activity or other network statistics such as number of packets, number of bytes, number of flows, bandwidth usage, response time, latency, packet loss, jitter, and other network statistics.

The sensors 104 can also determine additional data for each session, bidirectional flow, flow, packet, or other more granular or less granular network communication. The additional data can include host and/or endpoint information, virtual partition information, sensor information, process information, user information, tenant information, application information, network topology, application dependency mapping, cluster information, or other information corresponding to each flow.

In some example embodiments, the sensors 104 can perform some preprocessing of the network traffic and corresponding data before sending the data to the collectors 108. For example, the sensors 104 can remove extraneous or duplicative data or they can create summaries of the data (e.g., latency, number of packets per flow, number of bytes per flow, number of flows, etc.). In some example embodiments, the sensors 104 can be configured to only capture certain types of connection information and disregard the rest. In some example embodiments, the sensors 104 can be configured to capture only a representative sample of packets (e.g., every 1,000th packet or other suitable sample rate) and corresponding data.

Since the sensors 104 may be located throughout the network, network traffic and corresponding data can be collected from multiple vantage points or multiple perspectives in the network to provide a more comprehensive view of network behavior. The capture of network traffic and corresponding data from multiple perspectives rather than just at a single sensor located in the data path or in communication with a component in the data path, allows data to be correlated from the various data sources, which may be used as additional data points the analytics engine 110. Further, collecting network traffic and corresponding data from multiple points of view ensures more accurate data is captured. For example, a conventional sensor network may be limited to sensors running on external-facing network devices (e.g., routers, switches, network appliances, etc.) such that east-west traffic, including VM-to-VM or container-to-container traffic on a same host, may not be monitored. In addition, packets that are dropped before traversing a network device or packets containing errors may not be accurately monitored by the conventional sensor network. The sensor network 104 of various example embodiments substantially mitigates or eliminates these issues altogether by locating sensors at multiple points of potential failure. Moreover, the network traffic monitoring system 100 can verify multiple instances of data for a flow (e.g., source endpoint flow data, network device flow data, and endpoint flow data) against one another.

In some example embodiments, the network traffic monitoring system 100 can assess a degree of accuracy of flow data sets from multiple sensors and utilize a flow data set from a single sensor determined to be the most accurate and/or complete. The degree of accuracy can be based on factors such as network topology (e.g., a sensor closer to the source may be more likely to be more accurate than a sensor closer to the destination), a state of a sensor or a node hosting the sensor (e.g., a compromised sensor/node may have less accurate flow data than an uncompromised sensor/node), or flow data volume (e.g., a sensor capturing a greater number of packets for a flow may be more accurate than a sensor capturing a smaller number of packets).

In some example embodiments, the network traffic monitoring system 100 can assemble the most accurate flow data set and corresponding from multiple sensors. For instance, a first sensor along a data path may capture data for a first packet of a flow but may be missing data for a second packet of the flow while the situation is reversed for a second sensor along the data path. The network traffic monitoring system 100 can assemble data for the flow from the first packet captured by the first sensor and the second packet captured by the second sensor.

As discussed, the sensors 104 can send network traffic data to the collectors 106. In an example embodiment, each sensor can be assigned to a primary collector and a secondary collector as part of a high availability scheme. If the primary collector fails or communications between the sensor and the primary collector are not otherwise possible, a sensor can send its network traffic and corresponding data to the secondary collector. In another example embodiment, the sensors 104 are not assigned specific collectors but the network traffic monitoring system can determine an optimal collector for receiving the network traffic and corresponding data through a discovery process. For example, a sensor can change where it sends it network traffic data if its environments changes, such as if a default collector fails or if the sensor is migrated to a new location and it would be optimal for the sensor to send its data to a different collector. For instance, it may be preferable for the sensor to send its network traffic and corresponding data on a particular path and/or to a particular collector based on latency, shortest path, monetary cost (e.g., using private resources versus a public resources provided by a public cloud provider), error rate, or some combination of these factors. In another example embodiment, a sensor can send different types of network traffic and corresponding data to different collectors. For example, the sensor can send network traffic data and corresponding related to one type of process to one collector and network traffic and corresponding data related to another type of process to another collector.

The collectors 106 can be any type of storage medium that can serve as a repository for the network traffic and corresponding data recorded by the sensors 104. In an example embodiment, data storage for the collectors 106 is located in an in-memory database, such as dashDB from IBM®, although it should be appreciated that the data storage for the collectors 106 can be any software and/or hardware capable of providing rapid random access speeds typically used for analytics software. In various example embodiments, the collectors 106 can utilize solid state drives, disk drives, magnetic tape drives, or a combination of the foregoing according to cost, responsiveness, and size requirements. Further, the collectors 106 can utilize various database structures such as a normalized relational database or a NoSQL database, among others.

In some example embodiments, the collectors 106 may only serve as network storage for the network traffic monitoring system 100. In such example embodiments, the network traffic monitoring system 100 can include a data mover module 108 for retrieving data from the collectors 106 and making the data available to network clients, such as the components of the analytics engine 110. In effect, the data mover module 108 can serve as a gateway for presenting network-attached storage to the network clients. In other example embodiments, the collectors 106 can perform additional functions, such as organizing, summarizing, and pre-processing data. For example, the collectors 106 can tabulate how often packets of certain sizes or types are transmitted from different nodes of the network. The collectors 106 can also characterize the traffic flows going to and from various nodes. In some example embodiments, the collectors 106 can match packets based on sequence numbers, thus identifying traffic flows and connection links. As it may be inefficient to retain all data indefinitely in certain circumstances, in some example embodiments, the collectors 106 can periodically replace detailed network traffic and corresponding data with consolidated summaries. In this manner, the collectors 106 can retain a complete dataset describing one period (e.g., the past minute or other suitable period of time), with a smaller dataset of another period (e.g., the previous 2-10 minutes or other suitable period of time), and progressively consolidate network traffic data of other periods of time (e.g., day, week, month, year, etc.). In some example embodiments, network traffic and corresponding data for a set of flows identified as normal or routine can be winnowed at an earlier period of time while a more complete data set may be retained for a lengthier period of time for another set of flows identified as anomalous or as an attack.

Computer networks may be exposed to a variety of different attacks that expose vulnerabilities of computer systems in order to compromise their security. Some network traffic may be associated with malicious programs or devices. The analytics engine 110 may be provided with examples of network states corresponding to an attack and network states corresponding to normal operation. The analytics engine 110 can then analyze network traffic and corresponding data to recognize when the network is under attack. In some example embodiments, the network may operate within a trusted environment for a period of time so that the analytics engine 110 can establish a baseline of normal operation. Since malware is constantly evolving and changing, machine learning may be used to dynamically update models that are used to identify malicious traffic patterns. Machine learning algorithms may be used to provide for the identification of anomalies within the network traffic based on dynamic modeling of network behavior.

In some example embodiments, the analytics engine 110 may be used to identify observations which differ from other examples in a dataset. For example, if a training set of example data with known outlier labels exists, supervised anomaly detection techniques may be used. Supervised anomaly detection techniques utilize data sets that have been labeled as normal and abnormal and train a classifier. In a case in which it is unknown whether examples in the training data are outliers, unsupervised anomaly techniques may be used. Unsupervised anomaly detection techniques may be used to detect anomalies in an unlabeled test data set under the assumption that the majority of instances in the data set are normal by looking for instances that seem to fit to the remainder of the data set.

In an example embodiment, the analytics engine 110 can include a data lake 130, an application dependency mapping (ADM) module 140, and elastic processing engines 150. The data lake 130 is a large-scale storage repository that provides massive storage for various types of data, enormous processing power, and the ability to handle nearly limitless concurrent tasks or jobs. In an example embodiment, the data lake 130 is implemented using the Hadoop® Distributed File System (HDFS™) from Apache® Software Foundation of Forest Hill, Md. HDFS™ is a highly scalable and distributed file system that can scale to thousands of cluster nodes, millions of files, and petabytes of data. HDFS™ is optimized for batch processing where data locations are exposed to allow computations to take place where the data resides. HDFS™ provides a single namespace for an entire cluster to allow for data coherency in a write-once, read-many access model. That is, clients can only append to existing files in the node. In HDFS™, files are separated into blocks, which are typically 64 MB in size and are replicated in multiple data nodes. Clients access data directly from data nodes.

In an example embodiment, the data mover 108 receives raw network traffic and corresponding data from the collectors 106 and distributes or pushes the data to the data lake 130. The data lake 130 can also receive and store out-of-band data 114, such as statuses on power levels, network availability, server performance, temperature conditions, cage door positions, and other data from internal sources, and third party data 116, such as security reports (e.g., provided by Cisco® Systems, Inc. of San Jose, Calif., Arbor Networks® of Burlington, Mass., Symantec® Corp. of Sunnyvale, Calif., Sophos® Group plc of Abingdon, England, Microsoft® Corp. of Seattle, Wash., Verizon® Communications, Inc. of New York, N.Y., among others), geo-location data, IP watch lists, Whois data, configuration management database (CMDB) or configuration management system (CMS) as a service, and other data from external sources. In another example embodiment, the data lake 130 may instead fetch or pull raw traffic and corresponding data from the collectors 106 and relevant data from the out-of-band data sources 114 and the third party data sources 116. In yet another example embodiment, the functionality of the collectors 106, the data mover 108, the out-of-band data sources 114, the third party data sources 116, and the data lake 130 can be combined. Various combinations and configurations are possible as would be known to one of ordinary skill in the art.

Each component of the data lake 130 can perform certain processing of the raw network traffic data and/or other data (e.g., host data, process data, user data, out-of-band data, third party data, etc.) to transform the raw data to a form useable by the elastic processing engines 150. In an example embodiment, the data lake 130 can include repositories for flow attributes 132, host and/or endpoint attributes 134, process attributes 136, and policy attributes 138. In some embodiments, the data lake 130 can also include repositories for VM or container attributes, application attributes, tenant attributes, network topology, application dependency maps, cluster attributes, etc.

The flow attributes 132 relate to information about flows traversing the network. A flow is generally one or more packets sharing certain attributes that are sent within a network within a specified period of time. The flow attributes 132 can include packet header fields such as a source address (e.g., Internet Protocol (IP) address, Media Access Control (MAC) address, Domain Name System (DNS) name, or other network address), source port, destination address, destination port, protocol type, class of service, among other fields. The source address may correspond to a first endpoint (e.g., network device, physical server, virtual partition, etc.) of the network, and the destination address may correspond to a second endpoint, a multicast group, or a broadcast domain. The flow attributes 132 can also include aggregate packet data such as flow start time, flow end time, number of packets for a flow, number of bytes for a flow, the union of TCP flags for a flow, among other flow data.

The host and/or endpoint attributes 134 describe host and/or endpoint data for each flow, and can include host and/or endpoint name, network address, operating system, CPU usage, network usage, disk space, ports, logged users, scheduled jobs, open files, and information regarding files and/or directories stored on a host and/or endpoint (e.g., presence, absence, or modifications of log files, configuration files, device special files, or protected electronic information). As discussed, in some embodiments, the host and/or endpoints attributes 134 can also include the out-of-band data 114 regarding hosts such as power level, temperature, and physical location (e.g., room, row, rack, cage door position, etc.) or the third party data 116 such as whether a host and/or endpoint is on an IP watch list or otherwise associated with a security threat, Whois data, or geocoordinates. In some embodiments, the out-of-band data 114 and the third party data 116 may be associated by process, user, flow, or other more granular or less granular network element or network communication.

The process attributes 136 relate to process data corresponding to each flow, and can include process name (e.g., bash, httpd, netstat, etc.), ID, parent process ID, path (e.g., /usr2/username/bin/, /usr/local/bin, /usr/bin, etc.), CPU utilization, memory utilization, memory address, scheduling information, nice value, flags, priority, status, start time, terminal type, CPU time taken by the process, the command that started the process, and information regarding a process owner (e.g., user name, ID, user's real name, e-mail address, user's groups, terminal information, login time, expiration date of login, idle time, and information regarding files and/or directories of the user).

The policy attributes 138 contain information relating to network policies. Policies establish whether a particular flow is allowed or denied by the network as well as a specific route by which a packet traverses the network. For example, policies can be used to mark packets so that certain kinds of traffic receive differentiated service when used in combination with queuing techniques such as those based on priority, fairness, weighted fairness, token bucket, random early detection, round robin, among others. The policy attributes 138 can include policy statistics such as a number of times a policy was enforced or a number of times a policy was not enforced. The policy attributes 138 can also include associations with network traffic data. For example, flows found to be non-conformant can be linked or tagged with corresponding policies to assist in the investigation of non-conformance.

The analytics engine 110 may include any number of engines 150, including for example, a flow engine 152 for identifying flows (e.g., flow engine 152) or an attacks engine 154 for identify attacks to the network. In an example embodiment, the analytics engine can include a separate distributed denial of service (DDoS) attack engine 155 for specifically detecting DDoS attacks. In other example embodiments, a DDoS attack engine may be a component or a sub-engine of a general attacks engine. In some example embodiments, the attacks engine 154 and/or the DDoS engine 155 can use machine learning techniques to identify security threats to a network. For example, the attacks engine 154 and/or the DDoS engine 155 can be provided with examples of network states corresponding to an attack and network states corresponding to normal operation. The attacks engine 154 and/or the DDoS engine 155 can then analyze network traffic data to recognize when the network is under attack. In some example embodiments, the network can operate within a trusted environment for a time to establish a baseline for normal network operation for the attacks engine 154 and/or the DDoS.

The analytics engine 110 may further include a search engine 156. The search engine 156 may be configured, for example to perform a structured search, an NLP (Natural Language Processing) search, or a visual search. Data may be provided to the engines from one or more processing components.

The analytics engine 110 can also include a policy engine 158 that manages network policy, including creating and/or importing policies, monitoring policy conformance and non-conformance, enforcing policy, simulating changes to policy or network elements affecting policy, among other policy-related tasks.

The ADM module 140 can determine dependencies of applications of the network. That is, particular patterns of traffic may correspond to an application, and the interconnectivity or dependencies of the application can be mapped to generate a graph for the application (i.e., an application dependency mapping). In this context, an application refers to a set of networking components that provides connectivity for a given set of workloads. For example, in a conventional three-tier architecture for a web application, first endpoints of the web tier, second endpoints of the application tier, and third endpoints of the data tier make up the web application. The ADM module 140 can receive input data from various repositories of the data lake 130 (e.g., the flow attributes 132, the host and/or endpoint attributes 134, the process attributes 136, etc.). The ADM module 140 may analyze the input data to determine there is first traffic flowing between external endpoints on port 80 of the first endpoints corresponding to Hypertext Transfer Protocol (HTTP) requests and responses. The input data may also indicate second traffic between first ports of the first endpoints and second ports of the second endpoints corresponding to application server requests and responses and third traffic flowing between third ports of the second endpoints and fourth ports of the third endpoints corresponding to database requests and responses. The ADM module 140 may define an ADM for the web application as a three-tier application including a first EPG comprising the first endpoints, a second EPG comprising the second endpoints, and a third EPG comprising the third endpoints.

The presentation module 116 can include an application programming interface (API) or command line interface (CLI) 160, a security information and event management (SIEM) system interface 162, and a web front-end 164. As the analytics engine 110 processes network traffic and corresponding data and generates analytics data, the analytics data may not be in a human-readable form or it may be too large for a user to navigate. The presentation module 116 can take the analytics data generated by analytics engine 110 and further summarize, filter, and organize the analytics data as well as create intuitive presentations of the analytics data.

In an example embodiment, the API or CLI 160 is implemented using Hadoop® Hive from Apache® for the back end, and Java® Database Connectivity (JDBC) from Oracle® Corporation of Redwood Shores, Calif., as an API layer. Hive is a data warehouse infrastructure that provides data summarization and ad hoc querying. Hive provides a mechanism to query data using a variation of structured query language (SQL) that is called HiveQL. JDBC is an application programming interface (API) for the programming language Java®, which defines how a client may access a database.

In an example embodiment, the SIEM interface 162 can be implemented using Hadoop® Kafka for the back end, and software provided by Splunk®, Inc. of San Francisco, Calif. as the SIEM platform. Kafka is a distributed messaging system that is partitioned and replicated. Kafka uses the concept of topics. Topics are feeds of messages in specific categories. For example, Kafka can take raw packet captures and telemetry information from the data mover 108 as input, and output messages to a STEM platform, such as Splunk®. The Splunk® platform is utilized for searching, monitoring, and analyzing machine-generated data.

In an example embodiment, the web front-end 164 can be implemented using software provided by MongoDB®, Inc. of New York, N.Y. and Hadoop® ElasticSearch from Apache® for the back-end, and Ruby on Rails™ as the web application framework. MongoDB® is a document-oriented NoSQL database based on documents in the form of JavaScript® Object Notation (JSON) with dynamic schemas. ElasticSearch is a scalable and real-time search and analytics engine that provides domain-specific language (DSL) full querying based on JSON. Ruby on Rails™ is model-view-controller (MVC) framework that provides default structures for a database, a web service, and web pages. Ruby on Rails™ relies on web standards such as JSON or extensible markup language (XML) for data transfer, and hypertext markup language (HTML), cascading style sheets, (CSS), and JavaScript® for display and user interfacing.

Although FIG. 1 illustrates an example configuration of the various components of a network traffic monitoring system, those of skill in the art will understand that the components of the network traffic monitoring system 100 or any system described herein can be configured in a number of different ways and can include any other type and number of components. For example, the sensors 104, the collectors 106, the data mover 108, and the data lake 130 can belong to one hardware and/or software module or multiple separate modules. Other modules can also be combined into fewer components and/or further divided into more components.

Figure 2:
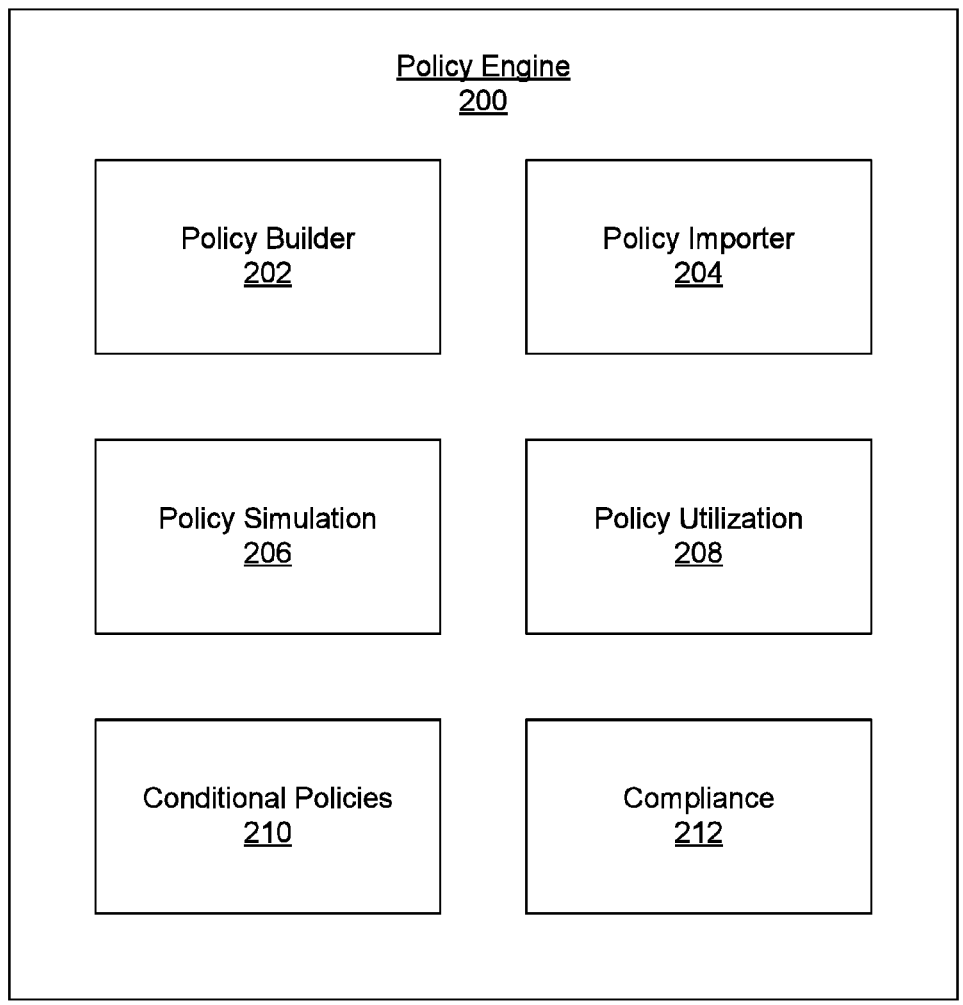
FIG. 2 illustrates a policy engine in accordance with an example embodiment.

FIG. 2 illustrates a policy engine 200, such as the policy engine 138 of FIG. 1, in accordance with an example embodiment. The policy engine 200 can include a policy builder module 202, a policy importer module 204, a policy simulation module 206, a policy utilization module 208, a conditional policies module 210, and a compliance module 212. In some example embodiments, a network traffic monitoring system, such as the network traffic monitoring system 100 of FIG. 1, can automatically determine network topology. Using network traffic data captured by sensors, such as the sensors 104 of FIG. 1, the network traffic monitoring system can determine the type of devices existing in the network (e.g., brand and model of switches, gateways, machines, etc.), physical locations (e.g., latitude and longitude, building, datacenter, room, row, rack, machine, etc.), interconnection type (e.g., 10 Gb Ethernet, fiber-optic, etc.), and network characteristics (e.g., bandwidth, latency, etc.). In addition, the network traffic monitoring system 110 can automatically detect changes to the network topology without the need for further configuration. In other example embodiments, the network topology and changes to the network topology can be configured by a network administrator.

In some example embodiments, the policy builder module 202 can receive the network topology (whether automatically generated, manually configured, or some combination thereof) and application dependency mappings, such as generated by the application dependency mapping (ADM) module 140 of FIG. 1, and the policy builder module 202 can automatically determine policies for the network. The policies can be based on whitelist rules or blacklist rules. A network defined by whitelist rules allows a communication between a source and a destination or otherwise defaults to denial of the communication system while a network defined by blacklist rules denies a communication between a source and a destination or otherwise defaults to allowing the communication. As an example of whitelist rule generation, suppose there is an edge of an application dependency mapping between a first endpoint or EPG E1 and a second endpoint or EPG E2. Permissible traffic flows on a set of ports of E1 to one or more ports of E2. A policy can be defined to reflect the permissible traffic from the set of ports of E1 to the one or more ports of E2.

The policy importer module 204 imports a preexisting set of network policies to the policy engine 138. In some example embodiments, the preexisting set of policies may be based on blacklist rules, and the policy importer module 204 can translate the set of blacklist rules to a set of whitelist rules. For example, the policy importer module 204 can receive ADMs for each application running in the network and the blacklist rules. The policy importer module 204 can utilize the ADMs to define policies limiting communication between endpoints and EPGs corresponding to edges of the ADMs.

The policy engine 200 can also verify that the generated policies based on whitelist rules prevent any traffic that was explicitly denied by the preexisting set of policies based on the blacklist rules. To that end, the policy simulation module 206 can be used to validate that changes to policy will not result in network misconfiguration and vulnerability to attacks. The policy simulation module 206 provides what if analysis, i.e., analyzing what would happen to network traffic upon adding one or more new policies, removing one or more existing policies, or changing membership of one or more EPGs (e.g., adding one or more new endpoints to an EPG, removing one or more endpoints from an EPG, or moving one or more endpoints from one EPG to another). In some example embodiments, the policy simulation module 206 utilizes historical ground truth flows for simulating network traffic based on what if experiments. That is, the policy simulation module 206 may apply the addition or removal of policies and/or changes to EPGs to a simulated network environment that mirrors the actual network to evaluate the effects of the addition or removal of policies and/or EPG changes. The policy simulation module 206 can determine whether the policy changes break or misconfigure networking operations of any applications in the simulated network environment or allow any attacks to the simulated network environment that were previously thwarted by the actual network with the original set of policies. The policy simulation module 206 can also determine whether the policy changes correct misconfigurations and prevent attacks that occurred in the actual network. In some example embodiments, the policy simulation module 206 can evaluate real time flows in a simulated network environment configured to operate with an experimental policy set or experimental set of EPGs to understand how changes to particular policies or EPGs affect network traffic in the actual network.

The policy utilization module 208 evaluates network traffic for conformance or non-conformance with policies of the network. The policy utilization module 208 analyzes each flow in the network over a specified period of time (e.g., time of day, day of week or month, month(s) in a year, etc.) to determine which policies are being enforced and the extent (e.g., number of packets, number of bytes, number of flows, etc.) to which those policies are being enforced within the network. These policy utilization statistics can be used for smart ordering of policies, i.e., optimize ordering of policies in a policy table or garbage collection, i.e., removing unused policies from the policy table. Smart ordering reorders the sequence of policies such that those policies that are utilized more often are placed in a position where they will be checked faster. For example, policies with higher utilization can be cached for longer periods of time than policies with lower utilization and/or higher utilization policies can be sequenced higher than lower utilization policies for policy schemes that apply the first policy matching a flow. Garbage collection removes policies with zero (or effectively zero) utilization which can save memory usage on a network device and/or reduce processing for policy schemes that apply all policies matching a flow.

In some example embodiments, policies may be more than just a set of access control lists (ACLs), and policies can include a collection of inbound/outbound filters, traffic quality settings, marking rules/redirection rules, and Layers 4-7 service device graphs. In some example embodiments, a network can be configured to operate with dynamic policies using the conditional policies module 210. The conditional policies module 210, for example, allows policies to take into account the behavior or the state of an endpoint. In some example embodiments, endpoints in the network can be assigned a reputation, vulnerability index, or similar security measure that changes over time based on the security state of each endpoint. Each endpoint can also be grouped according to reputational EPGs depending on the value of the security measurement of each endpoint. For example, endpoints with high security scores can be assigned to a first EPG, endpoints with moderate security score can be assigned to a second EPG, and endpoints with a low security score can be assigned to a third EPG. The network can be configured to enforce a policy that denies all communications from endpoints in the third EPG but allow the endpoints in the third EPG access to image update servers or other remediation servers. Under this policy, an endpoint in the third EPG can make no communication in the network except to the image update or remediation servers. Upon the endpoint updating its image or otherwise becoming remediated, the endpoint may be assigned to the first or second EPGs and be allowed to communicate according to the policies applicable to one of those EPGs. Thus, the policies for the endpoint do not need to be manually updated to account for the changes to the security state of the endpoint. A variety of groupings can be utilized in other example embodiments, including binary groupings, groupings based on a scale between −1 to 1 or from 0 to 100, and semantic groupings (e.g., "Good," "OK," "Bad"), among other possibilities.

The compliance module 212 provides for design, implementation, management, monitoring, and auditing/reporting of regulatory compliance matters. In some example embodiments, the compliance module 212 can automatically generate network policies to ensure regulatory compliance. In some example embodiments, the compliance module 212 can analyze network traffic data to ensure the network enforces the network policies. In some example embodiments, the compliance module 212 can generate reports regarding the network's effectiveness with respect to compliance.

As discussed, all around the world, regulators and standards bodies are tightening compliance through expanded powers, higher penalties, and harsh enforcement actions. Some of these regulations and standards include the Health Insurance Portability and Accountability Act (HIPAA), Sarbanes Oxley (SOX), the Payment Card Industry Data Security Standard (PCI DSS), the Gramm-Leach-Bliley Act (GLBA), California Senate Bill 1386 (CA SB 1386), and the International Convergence of Capital Measurement and Capital Standards (Basel II).

HIPAA requires covered entities and business associates that create, receive, transmit, or maintain protected health information (PHI) in electronic form must make a good faith effort to protect the corporate computing environment from reasonably anticipated threats and vulnerabilities; and take reasonable and appropriate measures to protect the integrity, confidentiality, and security of such electronic data. Covered entities and business associates must perform an analysis of the potential risks to the electronic PHI for which they are responsible; and to then develop, implement, and maintain appropriate security measures to safeguard the integrity, confidentiality, and availability of that data. HIPAA provides standards and, in some cases, implementation specifications with which covered entities and business associates must comply.

SOX requires that the annual reports of public companies include an end-of-fiscal-year assessment of the effectiveness of internal control over financial reporting. SOX also requires that companies' independent auditors attest to, and report on, this assessment. The assessment of financial controls has been extended into network environments by the opinion of the Public Company Accounting Oversight Board (PCAOB), a private-sector, non-profit entity created by SOX to oversee the auditors of public companies.

GBLA protects the privacy and security of individuals' financial information collected, held, and processed by financial institutions. The privacy component requires financial institutions to provide their customers with an annual notice of their privacy practices and to allow customers to choose not to share such information. The safeguards component requires that financial institutions establish a comprehensive security program to protect the confidentiality and integrity of the private financial information in their records.

PCI DSS was developed to ensure safe handling of protected payment information, such as storage and transfer of credit card information. PCI DSS is the umbrella program for other credit card security programs, such as the Visa® Cardholder Information Security Program (CISP), MasterCard® Site Data Protection (SDP) program, and other credit card companies' standards for protecting customers' protected electronic information.

CA SB 1386 was promulgated to regulate the privacy of personal information to address the problem of identity theft. The bill requires an agency, person, or business that conducts business in California and owns or licenses computerized "personal information" to disclose any breach of security (to any resident whose unencrypted data is believed to have been disclosed). Many states and other jurisdictions have also proposed or enacted similar legislation.

Basel II provides recommendations from bank supervisors and central bankers of member countries of the Basel Committee on Banking Supervision for ensuring banks are not overleveraged. This agreement was created to promote universal consistency in the way banks and regulators approach risk management.

Although some vital differences exist among the various regulations and standards, there is a substantial amount of overlap in their areas of concern. FIG. 3 illustrates a mapping 300 of compliance recommendations and requirements 302 to relevant provisions of HIPAA 304, SOX 306, and PCI DSS 308 to network policies to address the compliance categories 302 in accordance with an example embodiment. For purposes of conciseness, citation is made only to HIPAA 304, SOX 306, and PCI DSS 308 in FIG. 3, but the principles disclosed herein are applicable for compliance relating to other regulations and standards. Compliance recommendations are safeguards that do not require strong technical controls. The compliance recommendations can be thought of as suggested best practices or "should-haves," and network policies are only incidentally implicated or not applicable. The compliance recommendations can include risk analysis 312, risk management 314, information system activity review 316, assigned security 318, authorization and/or supervision 320, contingency plan 338, and facility access control and validations 342.

The risk analysis recommendation 312 advises conducting an accurate and thorough assessment of the potential risks and vulnerabilities to protected electronic information stored by a network. The risk management recommendation 314 suggests implementing security measures to sufficiently reduce risks and vulnerabilities to a reasonable and appropriate level. The information system activity review recommendation 316 recommends procedures to regularly review records of information system activity, such as audit logs, access reports, and security incident tracking. The assigned security recommendation 318 advises assigning responsibility for the development and implementation of procedures for protecting protected electronic information stored in the network. The authorization and/or supervision recommendation 320 suggests procedures for the authorization and/or supervision of workforce members who work with protected electronic information or in locations where it might be accessed. The contingency plan recommendation 338 recommends establishing procedures that allow for facility access in support of restoration of lost data under disaster recovery plan and emergency access mode operations. The facility access control and validations recommendation 342 suggests implementing procedures to document repairs and modifications to the physical components of a facility related to security.

Terminations procedure recommendation 322 advises implementing policies and procedures to prohibit access to protected electronic information to an employee or a business upon termination of the employee or cease of business with the business associate. Although the terminations procedure recommendation 322 falls within the category of a compliance recommendation, network policies can be defined to address this safeguard. For example, the compliance module 212 can define a network policy to explicitly deny traffic associated with a terminated user (in a blacklist system) or reassigning the terminated user to an EPG prohibited from accessing the network (in a whitelist system).

Compliance requirements are "must-haves" for the network. In some example embodiments, compliance requirements, such as protection from malicious software 330 and response and reporting 338, can be fulfilled primarily by other components of a network traffic monitoring system (e.g., the network traffic monitoring system 100 of FIG. 1). The protection from malicious software requirement 330 requires appropriate protections against malicious software are in effect in the network. The response and reporting requirement 338 calls for identifying and responding to suspected or known security incidents; mitigate, to the extent practicable, harmful effects of security incidents that are known to the network; and document security incidents and their outcomes. The protection from malicious software requirement 330 and the response and reporting requirement 338 can be handled by an attacks engine, such as the attacks engine 154 or the DDoS engine 155 of FIG. 1. However, network policies can be defined that deny compromised endpoints general access to the network but allow access to image update, patch management, and other remediation endpoints.

In some example embodiments, the compliance module 212 can address compliance requirements directly, such as security management process requirement 310, healthcare clearinghouse isolation requirement 324, access authorization requirement 326, access establishment and modification requirement 328, login monitoring requirement 332, password management requirement 334, evaluation requirement 340, unique user identification requirement 344, emergency access requirement 346, automatic logoff requirement 348, encryption and decryption requirement 350, data integrity requirement 354, person or entity authentication requirement 356, and integrity controls requirement 358.

In some example embodiments, the compliance module 212 can define ACL-like policies and EPGs to satisfy compliance requirements, such as for the isolating healthcare clearinghouse requirement 324, the access authorization requirement 326, the access establishment and modification requirement 328, and the person or entity authentication requirement 356. The healthcare clearinghouse isolation requirement 324 dictates that if a health clearinghouse is part of a larger organization, the clearinghouse must implement policies and procedures that protect electronic PHI of the clearinghouse from unauthorized access by the larger organization. The compliance module 212 can segment the healthcare clearing house from the larger organization utilizing network policies that limit access of electronic PHI to healthcare cleaning house (in a whitelist system) or deny access to the electronic PHI to the larger organize (in a blacklist system). The access authorization requirement 326 concerns policies and procedures for granting access to protected electronic information, for example, through access to a workstation, transaction, program, process or mechanism. The access establishment and modification requirement 328 relates to policies and procedures that, based upon the network's access authorization policies, establish, document, review, and modify a user's right of access to a workstation, transaction, program, or process. The person or entity authentication requirement 356 assures that policies and procedures are in place to identify persons or entities seeking access to protected electronic information. The compliance module 212 can satisfy the access authorization 326, the access establishment and modification 328, and the person or entity authentication 356 requirements by defining network policies and EPGs limiting access to protected electronic information to appropriate users, processes, hosts and/or endpoints, etc. For example, the compliance module 212 could create a HIPAA EPG and define policies for this EPG to enforce HIPAA requirements.

In some example embodiments, the compliance module 212 can define conditional network policies in which traffic is allowed or denied depending on the state of a host and/or endpoint, process, or user associated with the flow. In an example embodiment, the compliance module 212 can define host/endpoint and/or process state-based network policies and EPGs relating to copying, saving, modifying, and deleting data and encryption of data during transit to protect against improper alteration or destruction of data, and to ensure that the data is accurate and complete. These policies can be designed to address the encryption and decryption requirement 350, the data integrity requirement 354, and the integrity controls requirement 358. The encryption and decryption requirement 350 concerns implementing a mechanism to encrypt and decrypt protected electronic information. The data integrity requirement 354 is directed to policies and procedures to secure protected electronic information from improper alteration or destruction. The integrity controls requirement 358 mandates policies and procedures for verifying that data has not been altered or destroyed in an unauthorized manner during transmission. When a host/endpoint or a process transacts with protected electronic information, the compliance module 212 can assign the host/endpoint or process to a special EPG that enforces data integrity. For example, an endpoint sensor can detect that its endpoint is handling electronic protected information and assign the endpoint to the special EPG.

In an example embodiment, the compliance module 212 can define user state-based network policies and EPGs for the login monitoring requirement 332, the password management requirement 334, the unique user identification requirement 344, the emergency access requirement 346, and the automatic logoff requirement 348. The login monitoring requirement 332 requires policies and procedures for monitoring login attempts and reporting discrepancies. In an example embodiment, the compliance module 212 can establish a user's reputation to be inversely related to the number of unsuccessful login attempts within a session or assign the user to a restricted EPG based on the number of unsuccessful logins exceeding an unsuccessful login threshold. The password management requirement 334 ensures that appropriate policies and procedures are in place to manage passwords for network access and access to protected electronic information and to limit passwords that are strong enough to prevent them from being guessed or exposed to brute force attacks or to otherwise become comprised. In an example embodiment, the compliance module 212 can determine the user's reputation to be related to the strength of the user's password or assign the user to a restricted EPG if the user's password does not meet password requirements. The unique user identification requirement 344 dictates that each user who has access to protected electronic information has a unique identifier. In an example embodiment, the compliance module 212 can assign different users with a same identifier to a restricted EPG. The emergency access requirement 346 relates to policies and procedures for obtaining necessary protected electronic information during an emergency. In an example embodiment, during times of emergency, the compliance module 212 can assign emergency response handlers to a superuser or privileged EPG. The automatic logoff requirement 348 requires that policies, procedures, and technical controls are in place to automatically logoff (terminate) a session after a predetermined period of inactivity. In an example embodiment, the compliance module 212 can compute the user's reputation as a function (e.g., linear or exponential decay) of the amount time the user is idle or assign the user to a restricted EPG if the user's idle time exceeds an idle time threshold.

In some example embodiments, the compliance module 212 can define comprehensive network policies and periodically audit or validate these policies to satisfy the security management process 310, the evaluation 340, and the audit controls 352 requirements. The security management process requirement 310 mandates implementing policies and procedures to prevent, detect, contain, and correct security violations. The evaluation requirement 340 obligates periodic technical evaluations to ensure that protections are still in place and working effectively. The audit controls requirement 352 pertains to implementing hardware, software, and/or procedural mechanisms that record and examine activity in information systems that contain or use protected electronic information.

Figure 4:
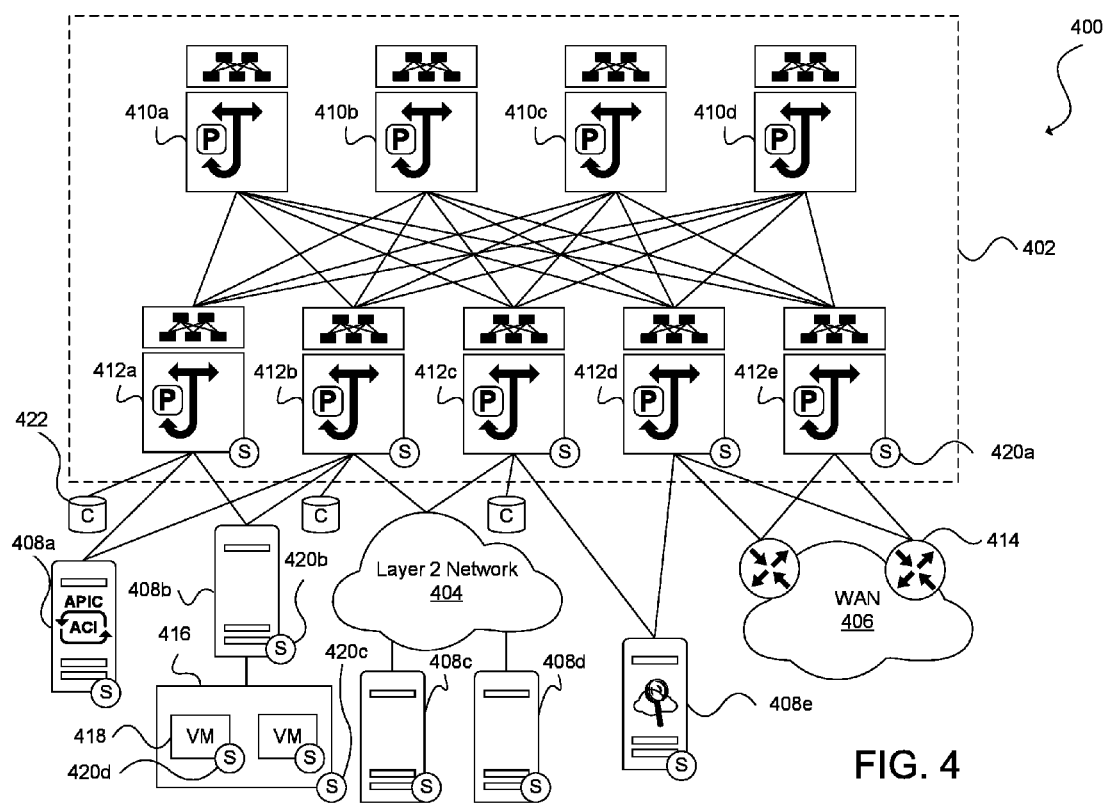
FIG. 4 illustrates a network environment in accordance with an example embodiment.

FIG. 4 illustrates a network environment 400 in accordance with an example embodiment. It should be understood that, for the network environment 400 and any environment discussed herein, there can be additional or fewer nodes, devices, links, networks, or components in similar or alternative configurations. Example embodiments with different numbers and/or types of clients, networks, nodes, cloud components, servers, software components, devices, virtual or physical resources, configurations, topologies, services, appliances, deployments, or network devices are also contemplated herein. Further, the network environment 400 can include any number or type of resources, which can be accessed and utilized by clients or tenants. The illustrations and examples provided herein are for clarity and simplicity.

The network environment 400 can include a network fabric 402, a Layer 2 (L2) network 404, a Layer 3 (L3) network 406, and servers 408a, 408b, 408c, 408d, and 408e (collectively, 408). The network fabric 402 can include spine switches 410a, 410b, 410c, and 410d (collectively, 410) and leaf switches 412a, 412b, 412c, 412d, and 412e (collectively, 412). The spine switches 410 can connect to the leaf switches 412 in the network fabric 402. The leaf switches 412 can include access ports (or non-fabric ports) and fabric ports. The fabric ports can provide uplinks to the spine switches 410, while the access ports can provide connectivity to endpoints (e.g., the servers 408), internal networks (e.g., the L2 network 404), or external networks (e.g., the L3 network 406).

The leaf switches 412 can reside at the edge of the network fabric 402, and can thus represent the physical network edge. For instance, in an example embodiment, the leaf switches 412d and 412e operate as border leaf switches in communication with edge devices 414 located in the external network 406. The border leaf switches 412d and 412e may be used to connect any type of external network device, service (e.g., firewall, deep packet inspector, traffic monitor, load balancer, etc.), or network (e.g., the L3 network 406) to the fabric 402.

Although the network fabric 402 is illustrated and described herein as an example leaf-spine architecture, one of ordinary skill in the art will readily recognize that various embodiments can be implemented based on any network topology, including any data center or cloud network fabric. Indeed, other architectures, designs, infrastructures, and variations are contemplated herein. For example, the principles disclosed herein are applicable to topologies including three-tier (including core, aggregation, and access levels), fat tree, mesh, bus, hub and spoke, etc. Thus, in some example embodiments, the leaf switches 412 can be top-of-rack switches configured according to a top-of-rack architecture. In other example embodiments, the leaf switches 412 can be aggregation switches in any particular topology, such as end-of-row or middle-of-row topologies. In some example embodiments, the leaf switches 412 can also be implemented using aggregation switches.

Moreover, the topology illustrated in FIG. 4 and described herein is readily scalable and may accommodate a large number of components, as well as more complicated arrangements and configurations. For example, the network may include any number of fabrics 402, which may be geographically dispersed or located in the same geographic area. Thus, network nodes may be used in any suitable network topology, which may include any number of servers, virtual machines or containers, switches, routers, appliances, controllers, gateways, or other nodes interconnected to form a large and complex network. Nodes may be coupled to other nodes or networks through one or more interfaces employing any suitable wired or wireless connection, which provides a viable pathway for electronic communications.

Network communication in the network fabric 402 can flow through the leaf switches 412. In an example embodiment, the leaf switches 412 can provide endpoints (e.g., the servers 408), internal networks (e.g., the L2 network 404), or external networks (e.g., the L3 network 406) access to the network fabric 402, and can connect the leaf switches 412 to each other. In some example embodiments, the leaf switches 412 can connect endpoint groups (EPGs) to the network fabric 402, internal networks (e.g., the L2 network 404), and/or any external networks (e.g., the L3 network 406). EPGs are groupings of applications, or application components, and tiers for implementing forwarding and policy logic. EPGs can allow for separation of network policy, security, and forwarding from addressing by using logical application boundaries. EPGs can be used in the network environment 400 for mapping applications in the network. For example, EPGs can comprise a grouping of endpoints in the network indicating connectivity and policy for applications.

As discussed, the servers 408 can connect to the network fabric 402 via the leaf switches 412. For example, the servers 408a and 408b can connect directly to the leaf switches 412a and 412b, which can connect the servers 408a and 408b to the network fabric 402 and/or any of the other leaf switches. The servers 408c and 408d can connect to the leaf switches 412b and 412c via the L2 network 404. In an example embodiment, the servers 408c and 408d and the L2 network 404 make up a local area network (LAN). LANs can connect nodes over dedicated private communications links located in the same general physical location, such as a building or campus.

The WAN 406 can connect to the leaf switches 412d or 412e via the L3 network 406. WANs can connect geographically dispersed nodes over long-distance communications links, such as common carrier telephone lines, optical light paths, synchronous optical networks (SONET), or synchronous digital hierarchy (SDH) links. LANs and WANs can include L2 and/or L3 networks and endpoints.

The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol can refer to a set of rules defining how the nodes interact with each other. Computer networks may be further interconnected by an intermediate network node, such as a router, to extend the effective size of each network. The endpoints 408 can include any communication device or component, such as a computer, server, blade, hypervisor, virtual machine, container, process (e.g., running on a virtual machine), switch, router, gateway, host, device, external network, etc.

In an example embodiment, the network environment 400 also includes a network controller running on the host 408a. The network controller is implemented using the Application Policy Infrastructure Controller (APIC™) from Cisco®. The APIC™ provides a centralized point of automation and management, policy programming, application deployment, and health monitoring for the fabric 402. In an example embodiment, the APIC™ is operated as a replicated synchronized clustered controller. In other example embodiments, other configurations or software-defined networking (SDN) platforms can be utilized for managing the fabric 402.

In some example embodiments, a physical server 408 may have instantiated thereon a hypervisor 416 for creating and running one or more virtual switches (not shown) and one or more virtual machines 418, as shown for the host 408b. In other example embodiments, physical servers may run a shared kernel for hosting containers. In yet other embodiments, the physical server 408 can run other software for supporting other virtual partitioning approaches. Networks in accordance with various embodiments may include any number of physical servers hosting any number of virtual machines, containers, or other virtual partitions. Hosts may also comprise blade/physical servers without virtual machines, containers, or other virtual partitions, such as the servers 408a, 408c, 408d, and 408e.

The network environment 400 can also integrate a network traffic monitoring system, such as the network traffic monitoring system 100 shown in FIG. 1. For example, the network traffic monitoring system of FIG. 4 includes sensors 420a, 420b, 420c, and 420d (collectively, 420), collectors 422, and an analytics engine, such as the analytics engine 110 of FIG. 1, executing on the server 408e. The analytics engine 408e can receive and process network traffic data collected by the collectors 422 and detected by the sensors 420 placed on nodes located throughout the network environment 400. Although the analytics engine 408e is shown to be a standalone network appliance in FIG. 4, it will be appreciated that the analytics engine 408e can also be implemented as a virtual partition (e.g., VM or container) that can be distributed onto a host or cluster of hosts, a software as a service (SaaS), or other suitable method of distribution. In an example embodiment, the sensors 420 are run on the leaf switches 412 (e.g., the sensor 420a), the hosts 408 (e.g., the sensor 420b), the hypervisor 416 (e.g., the sensor 420c), and the VMs 418 (e.g., the sensor 420d). In other example embodiments, the sensors 420 can also run on the spine switches 410, virtual switches, service appliances (e.g., firewall, deep packet inspector, traffic monitor, load balancer, etc.) and in between network elements. In some example embodiments, the sensors 420 can be located at each (or nearly every) network component to capture granular packet statistics and corresponding data at each hop of data transmission. In other example embodiments, the sensors 420 may not be installed in all components or portions of the network (e.g., shared hosting environment in which customers have exclusive control of some virtual machines).

As shown in FIG. 4, a host may include multiple sensors 420 running on the host (e.g., the host sensor 420b) and various components of the host (e.g., the hypervisor sensor 420c and the VM sensor 420d) so that all (or substantially all) packets traversing the network environment 400 may be monitored. For example, if one of the VMs 418 running on the host 408b receives a first packet from the WAN 406, the first packet may pass through the border leaf switch 412d, the spine switch 410b, the leaf switch 412b, the host 408b, the hypervisor 416, and the VM. Since all or nearly all of these components contain a respective sensor, the first packet will likely be identified and reported to one of the collectors 422. As another example, if a second packet is transmitted from one of the VMs 418 running on the host 408b to the host 408d, sensors installed along the data path, such as at the VM 418, the hypervisor 416, the host 408b, the leaf switch 412b, and the host 408d will likely result in capture of metadata from the second packet.

Figure 5:
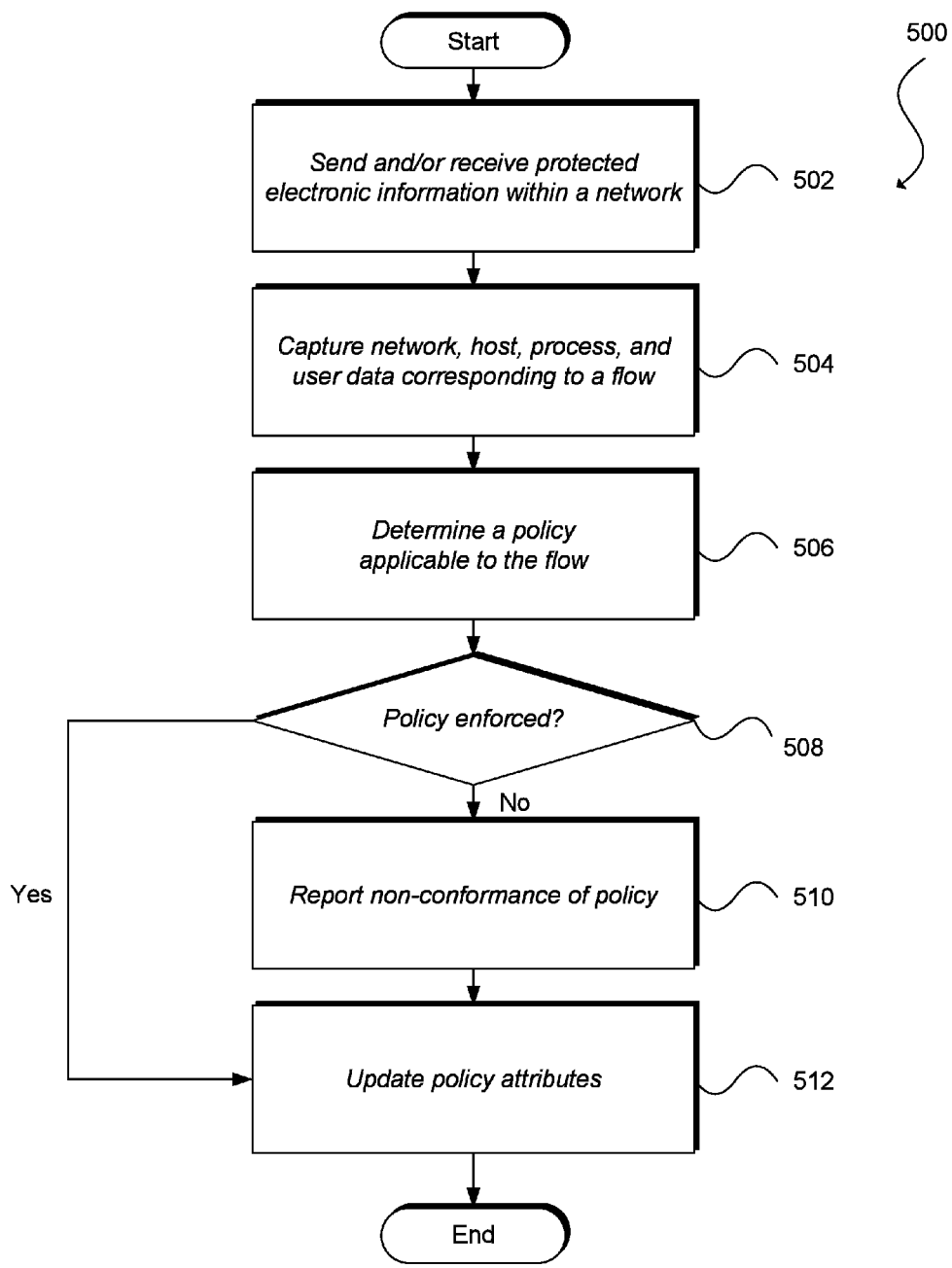
FIG. 5 shows an example process for providing compliance via network policies in accordance with an example embodiment.

FIG. 5 illustrates an example process 500 for providing compliance via network policies in accordance with an example embodiment. It should be understood that, for any process discussed herein, there can be additional, fewer, or alternative steps performed in similar or alternative orders, or in parallel, within the scope of the various example embodiments unless otherwise stated. The process 500 can be performed by a network, and particularly, a network traffic monitoring system (e.g., the network traffic monitoring system 100 of FIG. 1), a network controller (e.g., the network controller 118 of FIG. 1), a policy engine (e.g., the policy engine 200 of FIG. 2), a compliance module (e.g., the compliance module 212 of FIG. 2), a network operating system, a virtualization manager, a network virtualization manager, or a similar system.

In the example embodiment of FIG. 5, the process 500 can begin at step 502 in which protected electronic information is sent and/or received to a first endpoint of a network. A second endpoint receiving and/or sending the protected electronic information can also be a part of the same network or may be external to the network. Protected electronic information can refer to electronic data that is subject to a governmental regulation, industry standard, or similar guideline. Although there is an expectation of security for most if not all data traversing a network, there are situations in which some types of data can be classified as having a higher security priority than other types of data, certain types of data require encryption and others do not, breaches to particular types of data must be disclosed and other types of data have no such requirement, availability of some data is guaranteed while there is no guarantee for other types of data, and transactions relating to certain types of data must be monitored while other types of data do not require monitoring. Compliance concerns each of the former characteristics of data.

The process can continue at step 504 with the collection of network traffic data (e.g., metadata for sessions, flows, packets, etc.) and host data (e.g., network usage, CPU usage, information regarding files of the host, etc.), process data (process name, ID, parent process ID, path, CPU utilization, memory utilization, start-up command, etc.), and user data (e.g., user name, ID, information regarding files of the user, etc.) associated with the traffic. In some example embodiments, the traffic data can also be associated with out of band data (e.g., power level, temperature, and physical location) and third party data (e.g., security reports, IP watchlists, Whois, etc.). In some example embodiments, traffic can also be associated with application data (e.g., tenant information, application dependency mapping, application policies, etc.).

A sensor network can capture the collected data from multiple perspectives to provide a comprehensive view of network behavior. The sensor network may include sensors at multiple nodes of a data path (e.g., network devices, physical servers) and within multiple partitions of a node (e.g., hypervisor, shared kernel, VM, container, etc.).

After collection of the network traffic information, host and/or endpoint information, process information, user information, and other relevant information, at step 506, the network can determine the policies applicable to the network traffic. In some example embodiments, the network can determine one or more policies that are applicable for individual flows but it will be appreciated that other granularities are also possible (e.g., session, bidirectional flow, packet, etc.).

The policies may be mapped to specific provisions of regulations or standards (e.g., FIG. 3), and the policies can be applicable to an endpoint or a collection of endpoints (i.e., an EPG). In some example embodiments, the network can determine applicable policies for traffic by determining a source EPG and destination EPG and retrieving the applicable policies based on the source EPG and destination EPG. In some example embodiments, the network can dynamically determine an EPG associated with traffic based on a state of a host and/or endpoint, process, or user corresponding to the traffic. For instance, an endpoint associated with a flow may be a part of different EPGs over a period of time depending on a reputation or other security metric of the endpoint or a condition relating to the endpoint (e.g., the endpoint transacts with protected electronic information, a user of the endpoint has been idle for a period of time over an idle time threshold, the user has root access, etc.).

At step 508, the network can determine whether the applicable policies were enforced for traffic. In some example embodiments, the network can determine an expected network action for each flow and compare it to the actual or ground truth network action for each flow. Network actions can include allowing or forwarding a flow, denying or dropping the flow, marking the flow for quality of service (QoS), logging the flow, redirecting the flow, or selecting a service graph for the flow.

If the network determines that the applicable policies for a flow was not enforced, at step 510, the network can trigger an alert or otherwise report non-conformance to escalate a response. The process 500 can conclude at step 510 in which policy attributes can be updated based on conformance or non-conformance, and instances of policy non-conformance can be linked to corresponding network traffic. In some example embodiments, the policy attributes can be utilized to facilitate investigations regarding policy non-conformance. In some example embodiments, the policy attributes can be analyzed for both policy conformance and non-conformance, and compliance reports can be generated based on a mapping of a policy to a provision of a regulation, standard, or similar guideline.

Figure 6A:
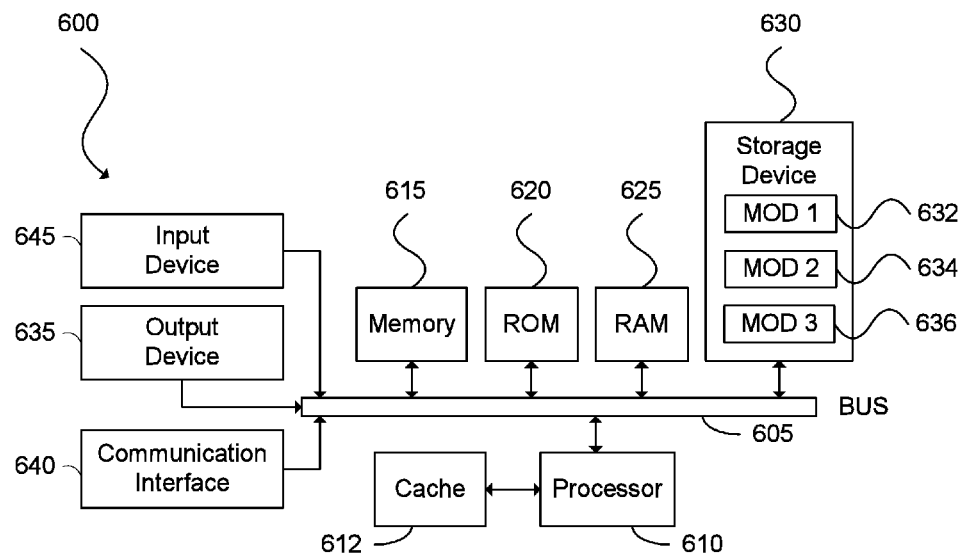
FIGS. 6A and 6B show systems in accordance with some example embodiments.
Figure 6B:
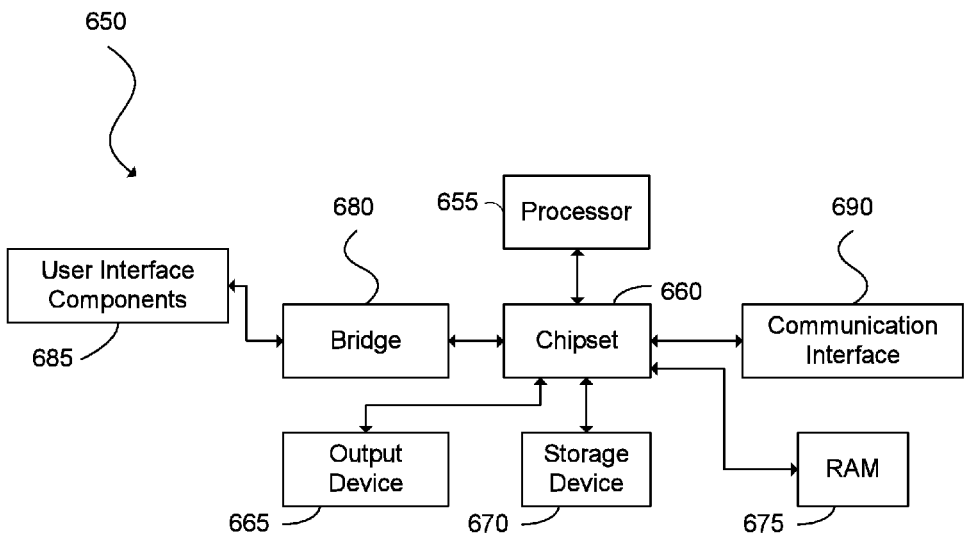

FIG. 6A and FIG. 6B illustrate systems in accordance with various example embodiments. The more appropriate system will be apparent to those of ordinary skill in the art when practicing the various embodiments. Persons of ordinary skill in the art will also readily appreciate that other systems are possible.

FIG. 6A illustrates an example architecture for a conventional bus computing system 600 wherein the components of the system are in electrical communication with each other using a bus 605. The computing system 600 can include a processing unit (CPU or processor) 610 and a system bus 605 that may couple various system components including the system memory 615, such as read only memory (ROM) in a storage device 670 and random access memory (RAM) 675, to the processor 610. The computing system 600 can include a cache 612 of high-speed memory connected directly with, in close proximity to, or integrated as part of the processor 610. The computing system 600 can copy data from the memory 615 and/or the storage device 630 to the cache 612 for quick access by the processor 610. In this way, the cache 612 can provide a performance boost that avoids processor delays while waiting for data. These and other modules can control or be configured to control the processor 610 to perform various actions. Other system memory 615 may be available for use as well. The memory 615 can include multiple different types of memory with different performance characteristics. The processor 610 can include any general purpose processor and a hardware module or software module, such as module 1 632, module 2 634, and module 3 636 stored in storage device 630, configured to control the processor 610 as well as a special-purpose processor where software instructions are incorporated into the actual processor design. The processor 610 may essentially be a completely self-contained computing system, containing multiple cores or processors, a bus, memory controller, cache, etc. A multi-core processor may be symmetric or asymmetric.

To enable user interaction with the computing system 600, an input device 645 can represent any number of input mechanisms, such as a microphone for speech, a touch-protected screen for gesture or graphical input, keyboard, mouse, motion input, speech and so forth. An output device 635 can also be one or more of a number of output mechanisms known to those of skill in the art. In some instances, multimodal systems can enable a user to provide multiple types of input to communicate with the computing system 600. The communications interface 640 can govern and manage the user input and system output. There may be no restriction on operating on any particular hardware arrangement and therefore the basic features here may easily be substituted for improved hardware or firmware arrangements as they are developed.

Storage device 630 can be a non-volatile memory and can be a hard disk or other types of computer readable media which can store data that are accessible by a computer, such as magnetic cassettes, flash memory cards, solid state memory devices, digital versatile disks, cartridges, random access memories (RAMs) 625, read only memory (ROM) 620, and hybrids thereof.

The storage device 630 can include software modules 632, 634, 636 for controlling the processor 610. Other hardware or software modules are contemplated. The storage device 630 can be connected to the system bus 605. In one aspect, a hardware module that performs a particular function can include the software component stored in a computer-readable medium in connection with the necessary hardware components, such as the processor 610, bus 605, output device 635, and so forth, to carry out the function.

FIG. 6B illustrates an example architecture for a conventional chipset computing system 650 that can be used in accordance with an example embodiment. The computing system 650 can include a processor 655, representative of any number of physically and/or logically distinct resources capable of executing software, firmware, and hardware configured to perform identified computations. The processor 655 can communicate with a chipset 660 that can control input to and output from the processor 655. In this example, the chipset 660 can output information to an output device 665, such as a display, and can read and write information to storage device 670, which can include magnetic media, and solid state media, for example. The chipset 660 can also read data from and write data to RAM 675. A bridge 680 for interfacing with a variety of user interface components 685 can be provided for interfacing with the chipset 660. The user interface components 685 can include a keyboard, a microphone, touch detection and processing circuitry, a pointing device, such as a mouse, and so on. Inputs to the computing system 650 can come from any of a variety of sources, machine generated and/or human generated.

The chipset 660 can also interface with one or more communication interfaces 690 that can have different physical interfaces. The communication interfaces 690 can include interfaces for wired and wireless LANs, for broadband wireless networks, as well as personal area networks. Some applications of the methods for generating, displaying, and using the GUI disclosed herein can include receiving ordered datasets over the physical interface or be generated by the machine itself by processor 655 analyzing data stored in the storage device 670 or the RAM 675. Further, the computing system 600 can receive inputs from a user via the user interface components 685 and execute appropriate functions, such as browsing functions by interpreting these inputs using the processor 655.

It will be appreciated that computing systems 600 and 650 can have more than one processor 610 and 655, respectively, or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A method comprising:
   capturing first network data, first host data, first process data, and first user data corresponding to a first flow that includes protected electronic information, the first network data captured by a first sensor of a first endpoint of a network, a second sensor of a second endpoint of the network, and a third sensor of a networking device along a data path corresponding to the first flow;
   analyzing the first network data, the first host data, the first process data, and the first user data to determine a policy applicable to the first flow;
   updating policy data based on an expected network action for the first flow and an actual network action for the first flow;
   determining a first degree of accuracy of first flow data corresponding to the first flow captured by the first sensor;
   determining a second degree of accuracy of second flow data corresponding to the first flow captured by the second sensor;
   determining a third degree of accuracy of third flow data corresponding to the first flow captured by the third sensor; and
   utilizing flow data having a highest degree of accuracy for the first flow.

2. The method of claim 1, further comprising:
   determining a source endpoint group corresponding to the first flow; and
   determining the first flow includes protected electronic information based on the source endpoint group.

3. The method of claim 1, further comprising:
   assembling flow data for the first flow using a first packet captured by one of the first sensor, the second sensor, or the third sensor and a second packet captured by another of the first sensor, the second sensor, or the third sensor.

4. The method of claim 1, wherein the first endpoint is a virtual partition, and the first network data further includes flow data captured by a fourth sensor of a host of the virtual partition.

5. The method of claim 1, wherein the first host data includes information regarding at least one of a name of a host corresponding to the first flow, a network address of the host, an operating system of the host, CPU utilization by the host, network utilization by the host, disk space of the host, ports of the host, users logged into the host, scheduled jobs, or a file or a directory of the host.

6. The method of claim 1, further comprising:
   determining a state of at least one of a host, a process, or a user corresponding to the first flow based on at least one of the first host data, the first process data, or the first user data; and
   determining a source endpoint group for the first flow based on the state,
   wherein the policy is determined based at least in part on the source endpoint group.

7. The method of claim 1, wherein the policy data comprises statistics regarding conformance and non-conformance of the policy, and the method further comprises:
   mapping the policy to a compliance requirement; and
   generating a compliance report based on the mapping and the policy data.

8. The method of claim 1, wherein the policy data comprises associations between flows not conforming to policies of the network, and the method further comprises:
   determining the first flow does not conform to the policy;
   associating the first flow with the policy in the policy data; and
   determining a cause of non-conformance of the policy based on the policy data.

9. The method of claim 1, further comprising:
   determining a network topology for the network;
   determining an application dependency mapping for an application including the first endpoint as a component of the application; and
   determining, based at least in part on the network topology and the application dependency mapping, a set of policies for the application.

10. The method of claim 1, wherein a first set of policies for the network comprises blacklist rules, and the method further comprises:
    generating a second set of policies for the network by translating the first set of policies to whitelist rules.

11. The method of claim 10, further comprising:
    applying the second set of policies to network data traversing the network in a network environment simulating the network.

12. A system comprising:
    a processor device; and
    a memory device including instructions that, upon being executed by the processor, cause the system to perform operations comprising:
      monitor network data, host data, process data, and user data for flows traversing a network, the network data monitored by a first sensor of a first endpoint of the network, a second sensor of a second endpoint of the network, and a third sensor of a networking device of the network, the flows including protected electronic information;
      determine policies applicable to the flows based on the network data, host data, process data, and user data;
      determine, based at least in part on one of the host data, the process data, or the user data, expected network actions for the flows by applying the policies to the network data; and
      update policy data based on the expected network actions and actual network actions for the flows;
      determine a first degree of accuracy of first flow data corresponding to the first flow captured by the first sensor;
      determine a second degree of accuracy of second flow data corresponding to the first flow captured by the second sensor;

determine a third degree of accuracy of third flow data corresponding to the first flow captured by the third sensor; and utilize flow data having a highest degree of accuracy for the first flow.

13. The system of claim 12, wherein the first endpoint is a host, the host includes a virtual partition, the virtual partition includes a fourth sensor, and the network data is further monitored by the fourth sensor.

14. The system of claim 13, wherein the first sensor is executed by a hypervisor or a shared kernel of the host.

15. The system of claim 12, wherein the process data includes information regarding at least one of a name of a process corresponding to a first flow, an identifier of the process, a parent process of the process, a path of the process, CPU utilization of the process, a memory address for the process, scheduling information for the process, a priority of the process, a start time of the process, a terminal type corresponding to the process, CPU time taken by the process, a command that started the process, and a process owner.

16. A non-transitory computer-readable medium having computer readable instructions that, upon being executed by a processor of a first endpoint of a network, cause the first endpoint to perform operations comprising:

send a first flow including protected electronic information to a second endpoint of the network;

capture first network data, first host data, first process data, and first user data corresponding to the first flow, the first network data captured by a first sensor of the first endpoint, a second sensor of the second endpoint, and a third sensor of a networking device along a data path corresponding to the first flow;

determine a policy applicable to the first flow based at least in part on one of the first host data, the first process data, and the first user data; and update policy data based on an expected network action for the first flow and an actual network action for the first flow;

determine a first degree of accuracy of first flow data corresponding to the first flow captured by the first sensor;

determine a second degree of accuracy of second flow data corresponding to the first flow captured by the second sensor;

determine a third degree of accuracy of third flow data corresponding to the first flow captured by the third sensor; and utilize flow data having a highest degree of accuracy for the first flow.

17. The non-transitory computer-readable medium of claim 16, wherein the first user data includes information regarding at least one of a name of a user corresponding to the first flow, a real name of the user, an e-mail address of the user, a group of the user, terminal information for the user, a login time of the user, an expiration date of a login, an idle time of the user, or a file or a directory of the user.

18. The non-transitory computer-readable medium of claim 16, wherein the instructions further cause the first endpoint to:

determine a first endpoint group of the first flow; and
determine a second endpoint group of the first flow,
wherein the policy is determined based on the first endpoint group and the second endpoint group.

19. The non-transitory computer-readable medium of claim 16, wherein the policy comprises at least one of statistics regarding conformance and non-conformance of the policy or associations between flows not conforming to policies of the network.

* * * * *